United States Patent [19]
Imai et al.

[11] Patent Number: 4,762,985
[45] Date of Patent: Aug. 9, 1988

[54] AUTO-FOCUS APPARATUS APPLIED TO IMAGE READING APPARATUS AND THE LIKE

[75] Inventors: Ryoichi Imai, Tokyo; Seiichiro Satomura, Kawasaki; Toshio Iwaya, Shiki, all of Japan

[73] Assignee: Canon Kabushiki Kaisha, Tokyo, Japan

[21] Appl. No.: 854,569

[22] Filed: Apr. 22, 1986

[30] Foreign Application Priority Data

| Apr. 25, 1985 | [JP] | Japan | 60-90314 |
| Oct. 18, 1985 | [JP] | Japan | 60-230961 |
| Oct. 18, 1985 | [JP] | Japan | 60-230962 |
| Oct. 29, 1985 | [JP] | Japan | 60-242362 |
| Oct. 31, 1985 | [JP] | Japan | 60-245481 |
| Nov. 6, 1985 | [JP] | Japan | 60-249620 |
| Nov. 13, 1985 | [JP] | Japan | 60-254233 |

[51] Int. Cl.⁴ .................... G03B 27/34; G02B 7/11
[52] U.S. Cl. ................................ 250/201; 356/444
[58] Field of Search ............... 250/201 PF, 201 AF, 250/201 R; 354/402, 404, 403, 405, 406, 409; 355/55; 356/443, 444; 358/227

[56] References Cited

U.S. PATENT DOCUMENTS

| 4,435,079 | 3/1984 | Hennick | 250/201 AF |
| 4,492,449 | 1/1985 | Oinoue et al. | 250/204 |
| 4,551,023 | 11/1985 | Nakauchi | 354/444 |
| 4,638,364 | 1/1987 | Hiramutsu | 354/402 |
| 4,653,926 | 3/1987 | Fukui | 354/444 |
| 4,674,126 | 6/1987 | Kotera | 358/282 |
| 4,700,237 | 10/1987 | Yoshioka et al. | 358/282 |

*Primary Examiner*—Edward P. Westin
*Assistant Examiner*—Charles Wieland
*Attorney, Agent, or Firm*—Fitzpatrick, Cella, Harper & Scinto

[57] ABSTRACT

In an auto-focus apparatus of the invention, an image sensor (e.g., a CCD) produces an image signal corresponding to an image on a microfilm. The image signal from the image sensor is encoded to a binary image signal by a binary encoding circuit. Alternation points (i.e., leading or trailing edges) of the binary image signal are counted by a counter. A system controller fetches count values from the counter, and detects an image position corresponding to a maximum count value. The system controller causes a lens driving circuit to move an imaging lens to the detected image position.

46 Claims, 27 Drawing Sheets

FIG. 3
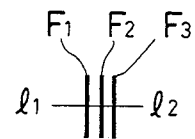
(a)
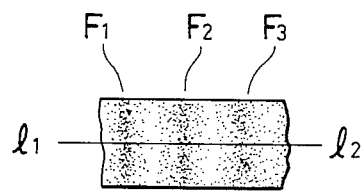
(b)
FIG. 4
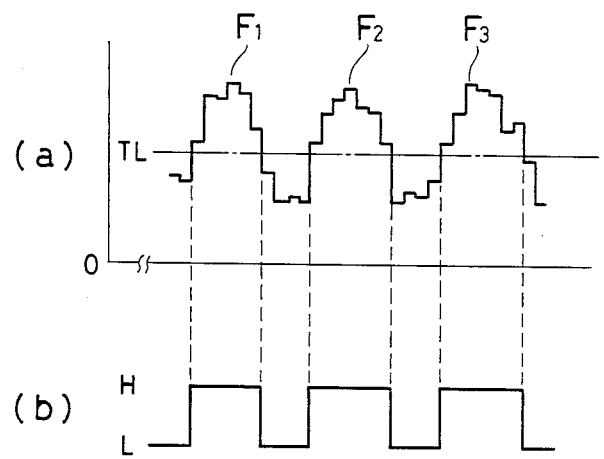

FIG. 5
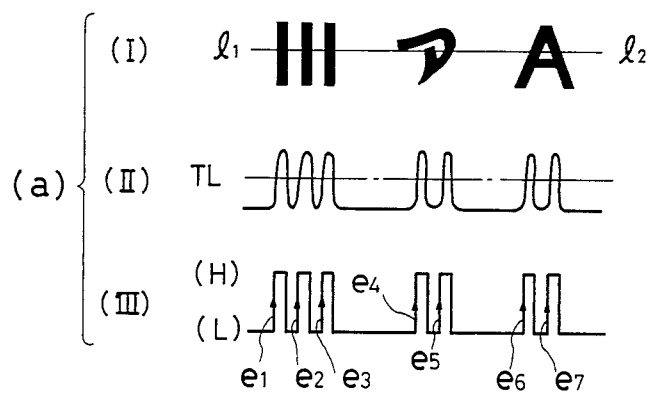
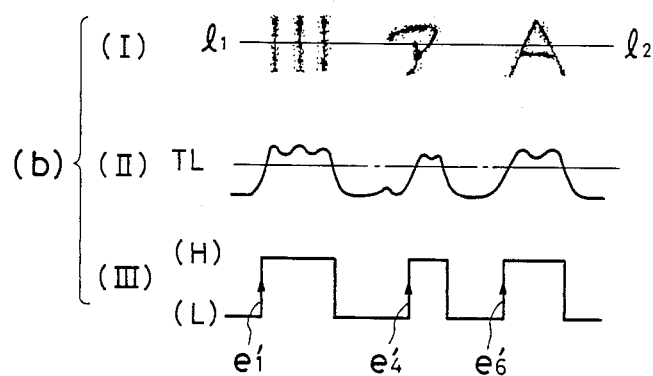

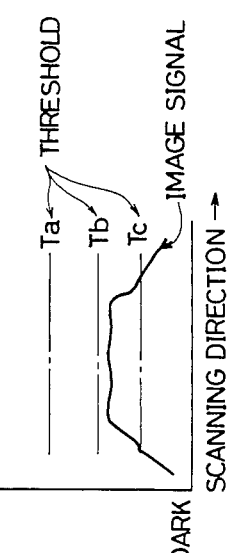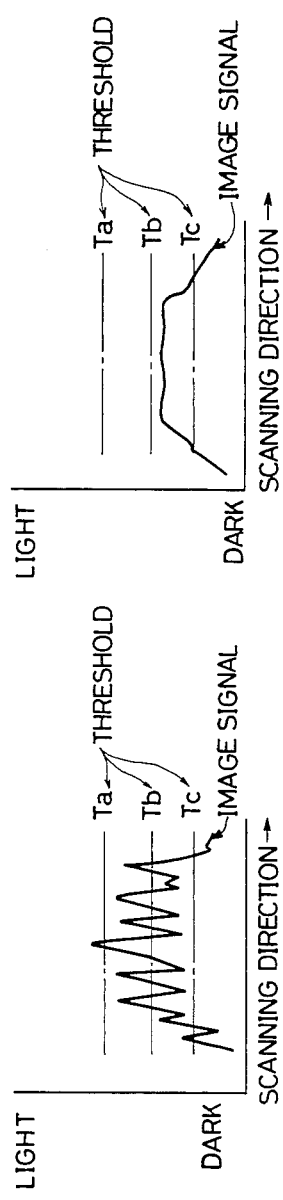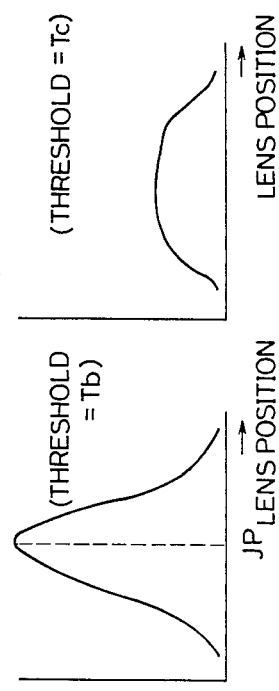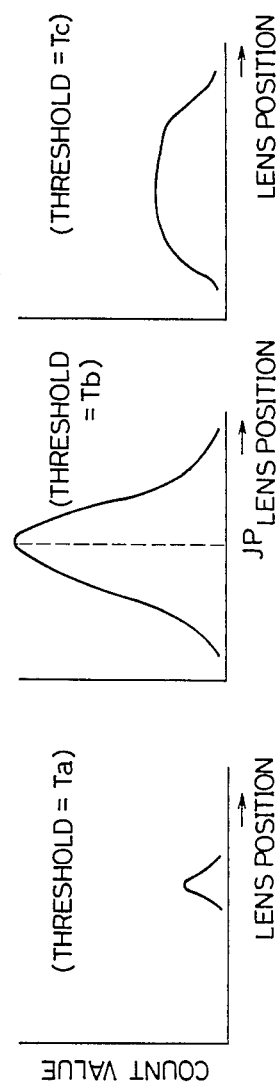

$Z = (X - Y1) + (X - Y2)$

AUTO-FOCUS APPARATUS APPLIED TO IMAGE READING APPARATUS AND THE LIKE

BACKGROUND OF THE INVENTION

Field of the Invention

The present invention relates to an auto-focus apparatus and, more particularly, to an auto-focus apparatus suitable for reading an image on, e.g., a microfilm.

Related Background Art

A conventional apparatus for electronically reading an image on a microfilm will be described with reference to FIG. 1(A).

Light emitted from a light source a passes through a lens b and exposes a film 1. The light passing through the film 1 is selectively guided to a screen h or an image reader 3 by an optical path switching mirror d through a lens group c. Focusing is performed such that a focal point of the lens group c is adjusted by pivoting the mirror d toward the screen side X. Thereafter, the optical path is switched by pivoting the mirror d to the image reader side Y, and a CCD f is driven by a motor g. The intensity of light incident on the CCD f is converted into an electrical signal. Note that e in FIG. 1(A) indicates a mirror.

The correspondence between a focal point of an image focused on the CCD f and that focused on the screen h is adjusted by an adapter lens AL. This adjustment is performed during assembly in the factory. However, the correspondence may be lost due to vibration during conveyance or transportation, expansion, contraction, or change over time of the mechanism (optical path) due to temperature variations, etc.

Therefore, a service man readjusts the adapter lens AL to recover the correspondence after the apparatus has been delivered. However, this readjustment takes a long time and requires skill.

If the adapter lens AL itself fails to clearly focus a film image on the screen h, an operator cannot confirm if an optimally focused state (to be referred to as a "just-focus state" hereinafter) is obtained. Therefore, the adapter lens AL must be machined with high precision to minimize aberrations and distortion and to obtain very high resolution, resulting in increased cost.

In any case, even if the above requirements are satisfied, it is difficult for an unskilled operator to adjust an image to the just-focus state.

Note that the operator moves the lens group c vertically to vary the distance, thereby focusing on an image on the film 1. In this case, the lens group c is moved such that power from a manual control or a motor is decelerated by gears and the like. However, in the apparatus of this type, a vertical movement margin about the focal point is several micrometers to several tens of micrometers (corresponding to a focal depth). If the lens movement falls outside this margin, this results in an out-of-focus state, and image data cannot be read accurately.

Thus, the apparatus of this type, in which the focal point is adjusted by monitoring an image on a screen, has a large number of problems.

In recent years, a so-called electronic filing system using an optical disk, which files original images electronically, has attracted much attention. Users who conventionally record original images on microfilm to file them must convert the microfilm images into electronic data suitable for an optical disk. This can be achieved by an electronic microfilm scanner, an apparatus which has been developed increasingly.

However, as described above, an image on the microfilm must be focused manually for each frame of the microfilm, which is time-consuming and results in inconvenience.

In order to eliminate the above drawbacks, a method wherein a focusing lens can be adjusted in accordance with the thickness of a film at a point preset during adjustment in the factory, has been proposed.

However, the thickness of microfilms varies widely depending on the type (e.g., silver film, diazo film, and so on) and manufacturers. Therefore, with this method, films which can be used are inconveniently limited. In addition, the preset point will be shifted over time, and must also be periodically adjusted by a service man.

Meanwhile, in the still camera field, a large number of auto-focus mechanisms have been introduced. FIG. 1(B) shows a typical such auto-focus mechanism. Light passing through a lens U partially passes through a half mirror V, is reflected by a mirror W, and is then guided to a beam splitter T. The light is split into three beams respectively having three different optical path lengths by the splitter T. First to third sensors R1 to R3 detect respective focusing data. More specifically, they detect an amount of light and, the larger the amount, the better the beam is focused. When the amount of light detected by the second sensor R2 is the largest, this represents a just-focus state. When the amount of light detected by the third sensor R3 is larger than that by the second sensor R2, this represents a pre-focus state. When the amount of light detected by the first sensor R1 is larger than that by the second sensor R2, this represents a post-focus state.

In the case of, e.g., a still camera having a large focal depth (the distance of the just-focus state), the beam splitter can be used to change an optical path length, thus allowing easy detection of the focusing state. However, when the focal depth is very small (e.g., several micrometers to 20 micrometers, as in a microfilm reader), a beam splitter cannot be used due to physical limitations.

Since there are many types of films to be read or different densities in recorded images, if an identical auto-focus operation is performed with respect to all the films, a good focus state cannot always be achieved.

Since noise components from a motor or heater in the apparatus or outside may often be superimposed on outputs from image sensors that are the basis of the auto-focus operation, precise focus detection is interfered with.

As described above, the microfilm reader has many problems, and it is difficult to manufacture a microfilm reader with an auto-focus mechanism for practical application.

SUMMARY OF THE INVENTION

The present invention has been made in consideration of the above situation, and has as its object to provide an auto-focus apparatus capable of a reliable auto-focus operation.

It is another object of the present invention to provide an auto-focus apparatus capable of a reliable auto-focus operation based on an image portion suitable therefor.

It is still another object of the present invention to provide an auto-focus apparatus which executes an auto-focus operation with high precision, and which can prevent an undesirable auto-focus operation.

It is still another object of the present invention to provide an auto-focus apparatus capable of a reliable auto-focus operation regardless of the density or content of an image.

It is still another object of the present invention to provide an auto-focus apparatus capable of a reliable auto-focus operation without being affected by external noise and the like.

It is still another object of the present invention to provide an auto-focus operation most suitable for an apparatus for reading an image on a microfilm and the like.

The above and other objects, features, and advantages of the invention will be apparent from the following detailed description.

BRIEF DESCRIPTION OF THE DRAWINGS

FIG. 3(a and b) is an illustration showing an image on a microfilm;

FIGS. 4(a and b) and 5(a and b) are timing charts showing outputs from sensors;

FIGS. 17(A) and 17(B) are graphs for explaining the relationship between a threshold value and an image signal;

FIGS. 18(A), 18(B) and 18(C) are graphs for explaining the relationship between a lens position and a count value;

DETAILED DESCRIPTION OF THE PREFERRED EMBODIMENTS

The present invention will be described hereinafter with reference to the accompanying drawings.

FIGS. 2 to 8 show a preferred embodiment of the present invention.

Figure 1A:
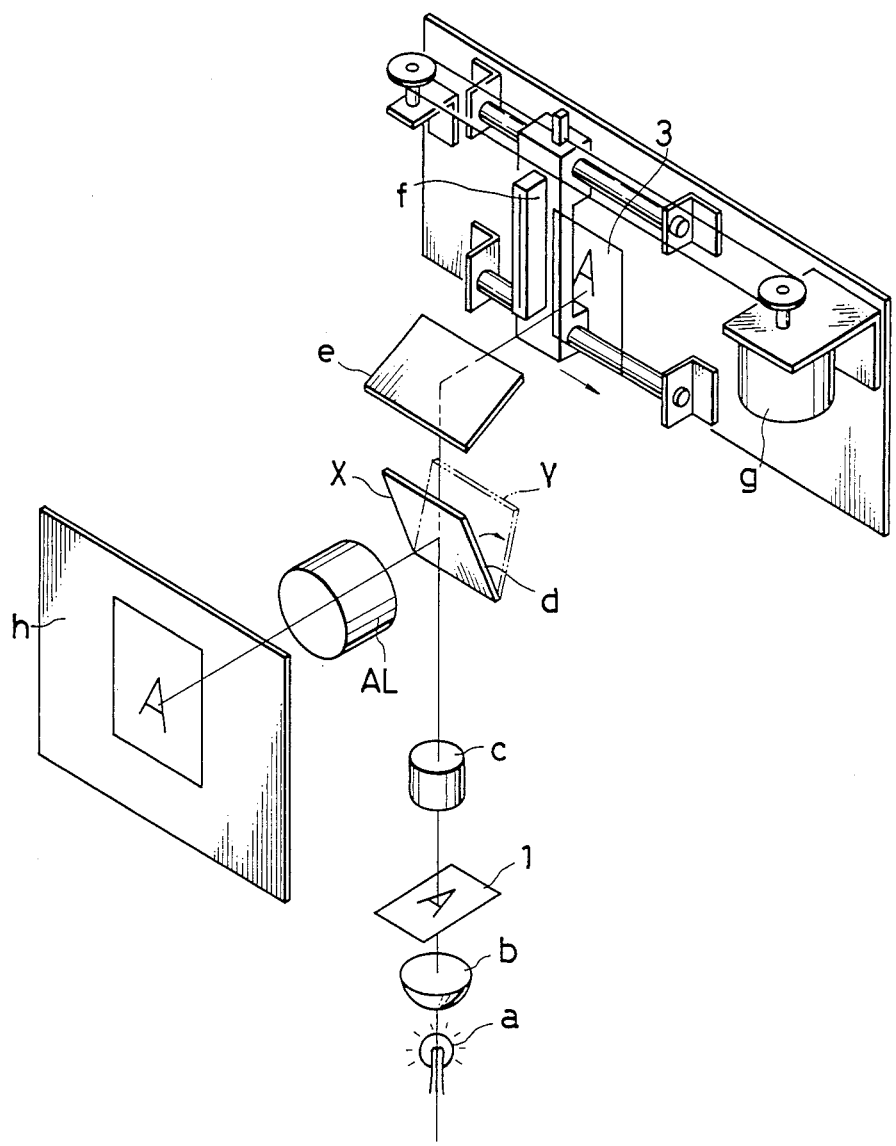
FIG. 1(A) is an illustration showing an arrangement of a microfilm reader.
Figure 1B:
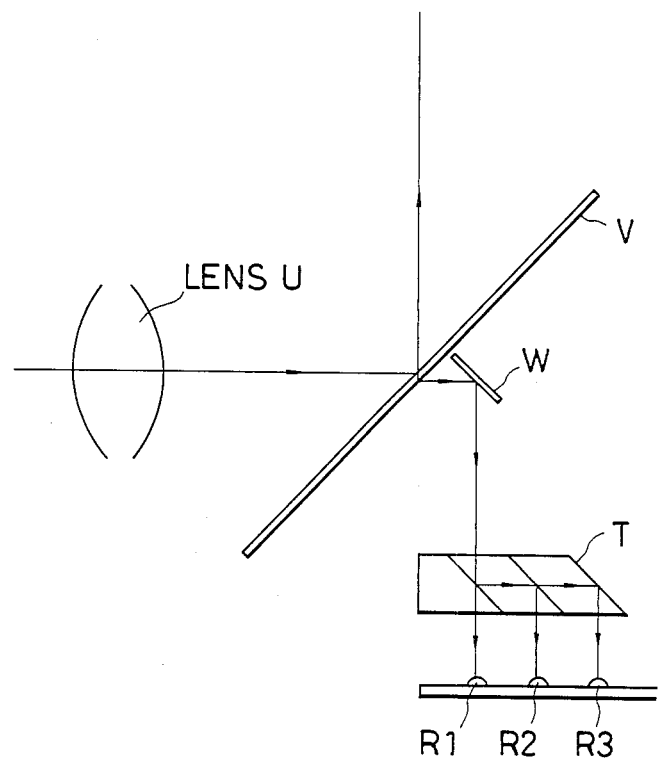
FIG. 1(B) is an illustration showing an auto-focus mechanism used in a still camera.
Figure 2:
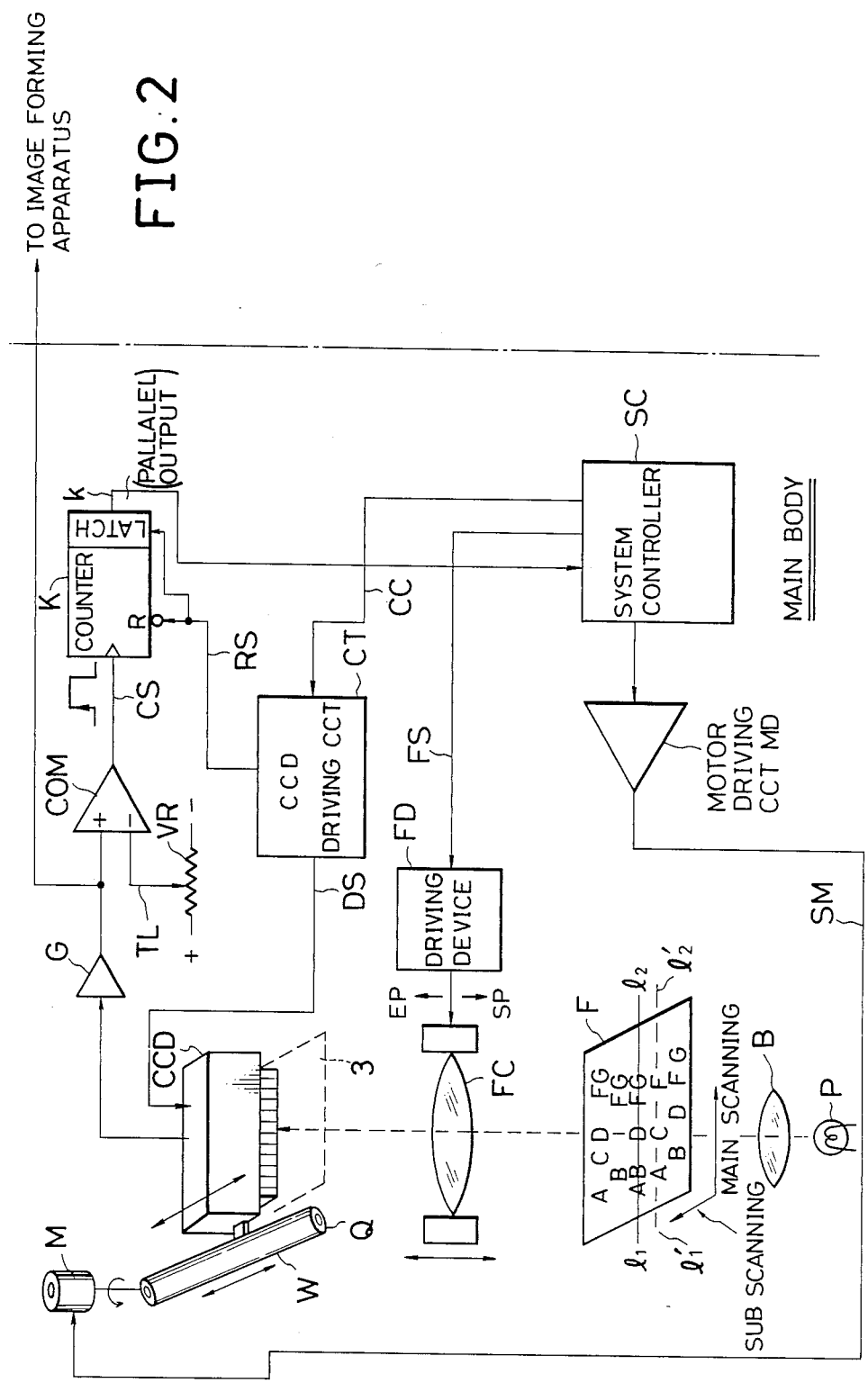
FIG. 2 is a block diagram of an arrangement of a microfilm reader according to an embodiment of the present invention.

Referring to FIG. 2, an image is recorded on a front or back surface of a microfilm F, which is illuminated with light emitted from a light source P and passing through a lens B. A main lens FC for focusing comprises a mechanism which is moved vertically using a driving mechanism FD (e.g., an eccentric cam) for converting rotational movement of a pulse motor into linear movement.

An image converged by the main lens FC is focused on a one-dimensional image sensor CCD consisting of a plurality of aligned light receiving elements. In this embodiment, an aligning direction of the light receiving elements of the image sensor CCD, i.e., a self-scanning direction, is defined as a main scanning direction.

A scanning operation in a direction substantially perpendicular to the main scanning direction (i.e., a sub scanning direction) is performed such that the image sensor CCD is directed in a direction perpendicular to the main scanning direction by a sub-scanning motor M, a pulley Q, and a wire W. Thus, a frame of an image on the film F can be sequentially read, line by line.

An image signal read by the image sensor CCD is subjected to predetermined processing by, e.g., an amplifier G, and is then output to an image forming apparatus (e.g., a laser beam printer or an optical disk unit, not shown).

A system controller SC produces a control signal CC for driving the image sensor CCD, a control signal SM for driving the sub-scanning motor M through a motor driving circuit MD, and a control signal FS for moving the main lens FC.

A CCD driving circuit CT produces a drive signal DS for driving the image sensor CCD, and a reset signal RS for synchronizing a counter K (to be described later) for counting focusing data.

A comparator COM continuously compares the output signal from the image sensor CCD with a voltage (preset threshold voltage) set by a threshold-value control VR. When the output signal is higher than a threshold value TL, the comparator COM produces an "H" signal as focusing data CS; otherwise, it produces an "L" signal.

The number of leading (or trailing) edges of the "H" or "L" signal is referred to as focusing data, and is counted by the counter K.

When the main lens FC is moved in a direction corresponding to an increase in the number of signal edges, an auto-focus operation can be realized.

More specifically, taking into consideration the fact that as the number of edges increases, a focusing state approaches a just-focus state, the count value from the counter K is discriminated by a CPU incorporated in the system controller SC, and the lens FC is moved so that the count value reaches its maximum (peak) value.

An auto-focus operation will be described below. FIG. 3(A) shows a portion of image data recorded on the film F (the microfilm is a normally a negative film, and black portions in FIG. 3(A) transmit light and white portions do not transmit light).

FIG. 3(B) is an enlarged view of FIG. 3(A). In FIG. 3(B), stripes $F_1$, $F_2$, and $F_3$ are gradually blurred toward their side portions. When the image data is sensed by the image sensor CCD in a line $l_1$-$l_2$ (in the main scanning direction), its output has a waveform as shown in FIG. 4(A). Note that each step in the waveform corresponds to each cell (light receiving element) of the image sensor CCD.

The output waveform is compared with the threshold value TL (i.e., binarized) by the comparator COM to obtain the output signal CS shown in FIG. 4(B). The signal CS is input to the counter K. The counter K receives the reset signal RS from the CCD driving circuit CT upon each completion of a single scanning operation of the image sensor CCD, and is reset. The counter K incorporates a latch, and automatically stores an immediately preceding count value in synchronism with the reset operation.

In this way, the counter K counts the number of edges contained in the output CS from the comparator COM during a single scanning interval in the main scanning direction of the image sensor CCD.

FIG. 5(A) shows a just-focus state, and FIG. 5(B) shows an out-of-focus state.

When the image sensor CCD scans between $l_1$ and $l_2$ in FIG. 5(A) (I) (i.e., in the main scanning direction), the waveform shown in FIG. 5(A) (II) is obtained (although the CCD output signal actually has a steplike waveform, this is simplified for the sake of easy understanding). When the output from the image sensor CCD is then converted into binary data based on the threshold value TL, the output signal CS has leading edges $e_1$ to $e_7$ shown in FIG. 5(A) (III) (i.e., a just-focus state).

The out-of-focus state shown in FIG. 5(B) will be described below.

FIG. 5(B) (I) shows images focused on the surface of the image sensor CCD, and the images between $l_1$ and $l_2$ are scanned in the main scanning direction. Note that the CCD output signal shown in FIG. 5(B) (II) crosses the threshold value TL a fewer number of times than that shown in FIG. 5(A) (II). Therefore, the resultant output signal CS from the comparator COM has a smaller number of leading edges (i.e., $e'_1$, $e'_4$, and $e'_6$) as shown in FIG. 5(B) (III) than that in the just-focus state.

In short, the leading edges e are counted to acquire a focusing state.

The focusing data (count value) is fetched by the CPU incorporated in the system controller SC, and the main lens FC is controlled so that the count value reaches its maximum value (peak value), thus setting the lens FC at a just-focus point JP.

Figure 6:
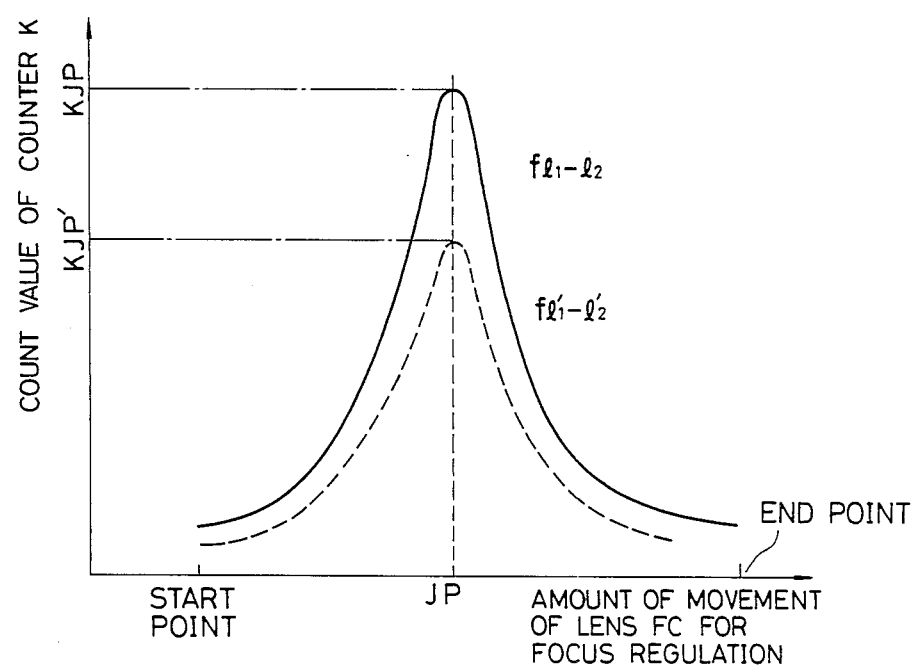
FIG. 6 is a graph for explaining count-value distribution.

FIG. 6 shows the relationship between the position of the lens FC and the focusing data (count value).

Note that a curve f $l_1$-$l_2$ in FIG. 6 indicates focusing data when an image on the film F between $l_1$ and $l_2$ in FIG. 2 is sensed by the image sensor CCD. In this case, a portion of letters "ABDFG" on the film F is sensed as focusing data. When an image on the film F between $l'_1$ and $l'_2$ (broken line) in FIG. 2 is sensed, a portion of letters "ACF" can be sensed. Thus, a peak level of the curve is lowered, as indicated by a broken curve fl$'_1$-l$'_2$ in FIG. 6.

Since the image on the film F is sensed by the one-dimensional image sensor, the maximum count value varies depending on a position at which the image on the film F is sensed. However, even if images on the film differ, when the lens FC is positioned at the point JP, the count value of the counter K is always at its maximum. Therefore, if the CPU detects the maximum value, it can detect the just-focus point JP.

Figure 7:
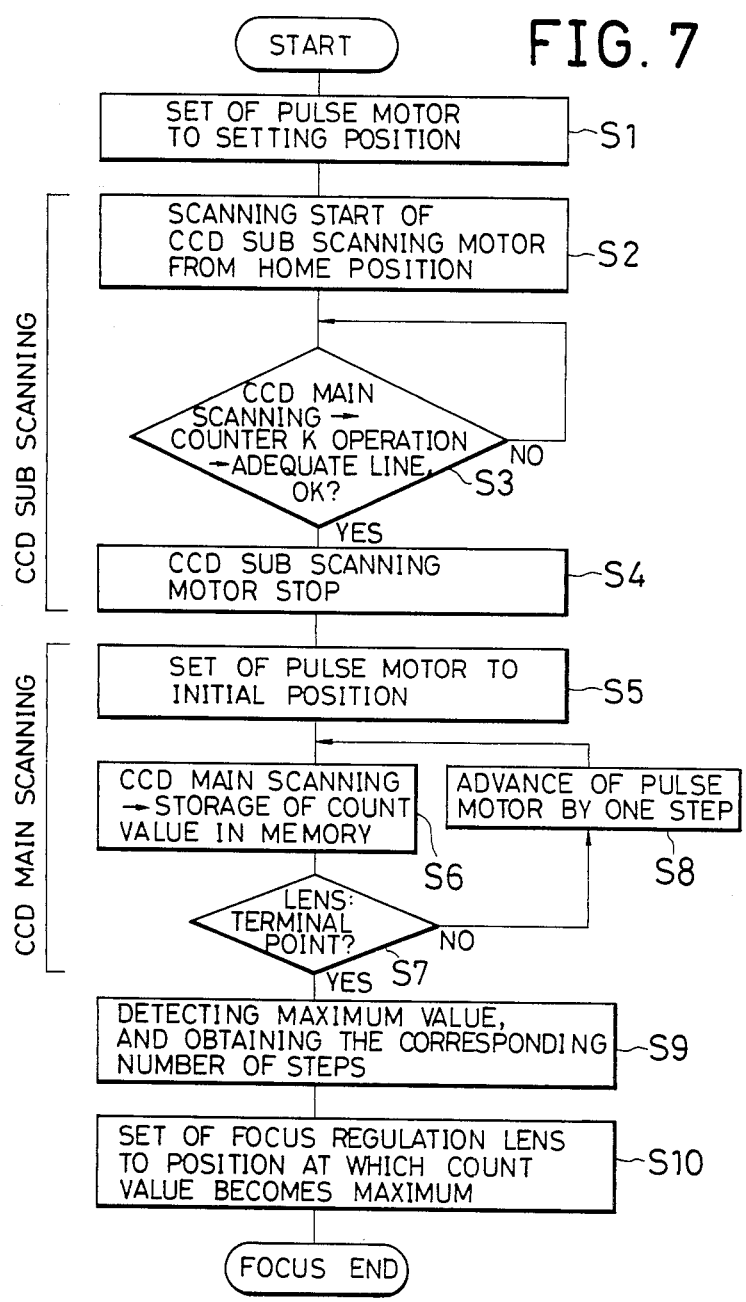
FIG. 7 is a flow chart for explaining a control sequence of a system controller.

FIG. 7 is a sequence flow chart of an auto-focus operation of the system controller SC.

Referring to FIG. 7, at the beginning of the auto-focus operation, the pulse motor for driving the lens FC is set at a reference position through the driving device FD in step S1. More specifically, the lens FC is set at the preset reference position. Next, in step S2, the sub-scanning motor M begins to rotate from the home position through a motor driving circuit MD, and the CCD main scanning operation is started.

In step S3, a point at which the count value of the counter K during 1-line scanning exceeds a predetermined value is detected. More specifically, an image line on the film F suitable for auto-focus detection is detected. When a position at which the count value exceeds the predetermined value is found, the flow advances to step S4, and the motor M is stopped to interrupt the sub-scanning operation. Thereby, the image sensor CCD can sense the position suitable for the auto-focus detection.

In step S5, the pulse motor for driving the lens FC is driven to set it at an initial position SP. Then, in step S6, the main scanning operation of the image sensor CCD is performed. In this case, the sub-scanning movement of the image sensor CCD is not performed. The count value of the counter K (the number of focusing data) is fetched for each main scanning operation. and is stored in a memory incorporated in the system controller SC. Note that a step number of the pulse motor is also stored therewith. It is checked in step S7 if the lens FC has reached a terminal position EP. If NO in step S7, the flow advances to step S8, and the pulse motor for the lens FC is driven by one step to move the lens FC toward the terminal position EP by one step. Then, returning to step S6, the image sensor CCD is caused to perform the main scanning operation, and the focusing data is counted and stored in the memory together with the step number of the pulse motor. When this operation is repeated until the lens FC has reached the terminal position EP, the count values of the counter K in a plurality of main scanning operations, which are performed at respective steps while the lens FC moves from the initial position to the terminal position, are stored in the memory.

After the lens FC has reached the terminal position EP, the flow advances to step S9, a maximum count value stored in the memory is detected, and the step number of the pulse motor corresponding to the detected maximum value is fetched. Next, in step S10, the pulse motor is driven so that the lens FC is moved to the position corresponding to the fetched step number. In this way, the lens FC is set at the just-focus point.

Figure 8:
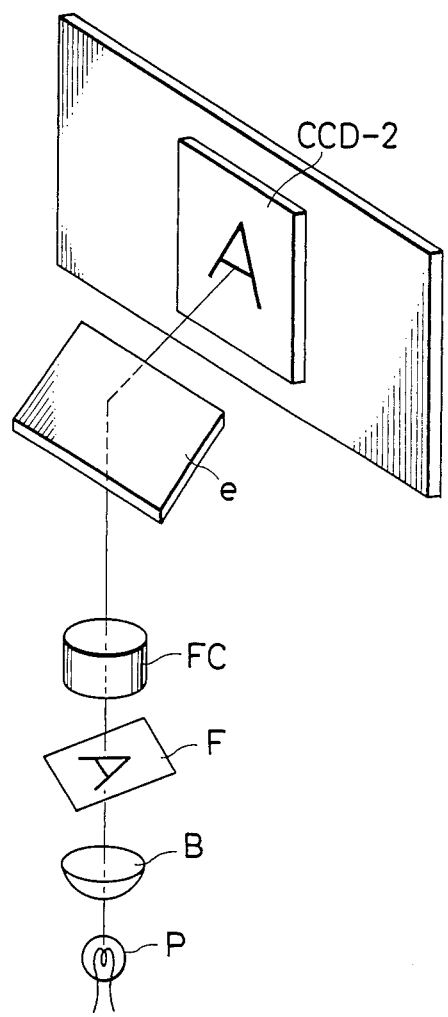
FIG. 8 is an illustration showing a schematic arrangement of an image reader according to another embodiment of the present invention.

In FIG. 8, a two-dimensional image sensor (CCD-2) is used as a focus detection image sensor and a reading image sensor. The focusing principle is the same as when the one-dimensional (array) image sensor is used. With this sensor, however, when an image is sensed and a focal point is detected, since sub and main scanning operations can be electronically switched (respective elements can be switched electronically), a mechanical scanning operation by means of the sub-scanning motor shown in FIG. 2 need not be performed.

The focus detection operation in this case is performed such that image data on an entire surface or on a particular portion of the image sensor CCD-2 is fetched, and the number of signal edges is counted to detect a focusing state.

In this embodiment, the one-dimensional image sensor (line sensor) consists of 5,000 elements, and the two-dimensional image sensor consists of 500×500 elements.

Also in this embodiment, a microfilm reader has been exemplified, but the present invention can be applied to a normal 35-mm film reader. Since the automatic focusing operation is enabled, a monitor screen need not be provided.

The present inveniton can also be applied to an auto-focus mechanism for an image reader for sensing books, documents and the like in addition to the film image reader.

Since one- and two-dimensional image sensors can be used, the present invention can also be applied to an imaging tube (particularly, a video camera). In this case, since a focus detection sensor need not be provided, the present invention can be applied to commercially available cameras.

As described above, the output signal from the image sensor is binarized with reference to a predetermined threshold value, and the number of edges of the binarized signal is counted to detect a focusing state. Therefore, since manual focusing on the screen need not be performed and dependent on human eyes, even in an apparatus which automatically converts and records an image from a microfilm in a optical-disk file apparatus, not only automatic focusing can be attained, but focusing precision can be also improved.

When a common sensor is used as a focus detecting element and a reading image sensor for an image reading system, there is no error in optical path length in focusing and image reading modes, and an auto-focus mechanism with very high precision can be provided.

In the above embodiment (FIG. 2), an image position for focus detection is determined when the number of edges of the CCD output has reached the predetermined number.

However, the number of signal edges from some film images may not reach the predetermined number, or some films may contain images more suitable for a focusing operation.

If an auto-focus operation is performed from a damaged or contaminated image or an image that has an area which only transmits light, precise focusing is interfered with and a good image cannot be obtained.

Another embodiment which enables a reliable auto-focus operation for such images will now be described.

Figure 9:
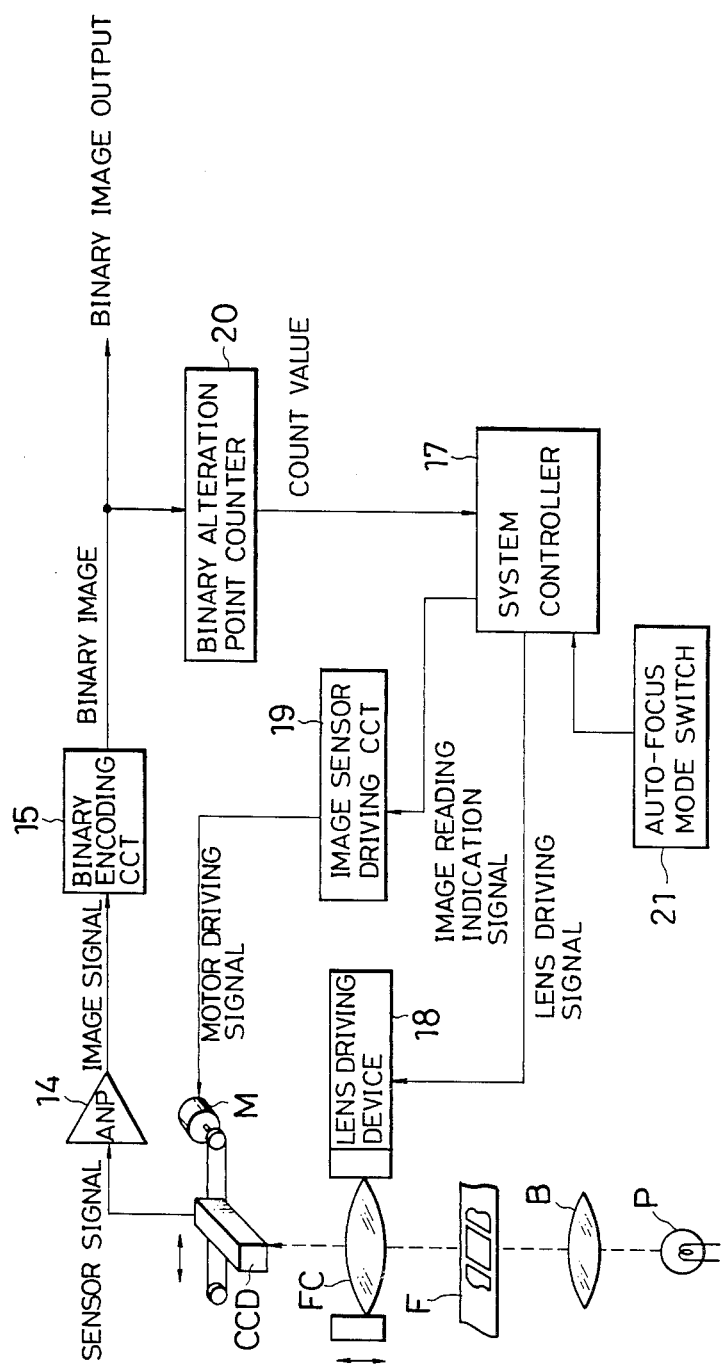
FIGS. 9, 13, and 15 are block diagrams of other circuit configurations of the microfilm reader.

FIG. 9 is a block diagram of a circuit configuration for focusing according to another embodiment of the present invention. Light emitted from a lamp P, as a light source for illuminating an image, is condensed by a condenser lens B. The light passing through a microfilm F is focused by an imaging lens FC, and is then received by an image sensor CCD to be converted into an electrical signal.

The image sensor CCD generates an analog sensor signal corresponding to an image on the microfilm F. The sensor signal, amplified by an amplifier 14, is encoded by a binary encoding circuit 15 having a comparator, and the binary image signal is then supplied to a printer or an image memory.

The number of alteration points (i.e., the number of edges) of the binary image signal is countered by a binary alteration point counter 20. When an identical line on the microfilm F is scanned several times, the count value from the counter 20 is at maximum when the imaging lens FC is set at an optimal focusing position.

A system controller 17 comprises a microcomputer, and generates an image reading indication signal to an image sensor driving circuit 19, so that the image sensor CCD is moved in response to a scanning signal generated from the circuit 19. The system controller 17 also supplies a lens driving signal to a lens driving device 18 to energize a pulse motor (not shown) arranged in the device 18, thereby displacing the imaging lens FC. Thus, an image at any focusing position can be sensed.

The system controller 17 sequentially fetches the count values from the counter 20 at respective positions while changing the focusing position of the imaging lens FC, and causes the imaging lens FC to be in a focusing position at which the count value is at maximum.

A sub-scanning motor M mechanically scans the image sensor CCD so as to read an image. The image sensor driving circuit 19 controls the motor M. A combination of the motor M and the circuit 19 thus allows reading of an image on any line on the microfilm F.

An operator operates an auto-focus mode switch 21 to execute an auto-focus operation through the system controller 17. In this embodiment, since the focusing operation can also be performed manually, the operator selects the manual focusing operation or the auto-focus operation using the switch 21.

With this arrangement, when the auto-focus operation is executed based on the above-mentioned principle, if a line containing no image is read, the auto-focus operation is disabled. Therefore, the larger the amount of image data in a line, the higher the reliability and precision of the auto-focus operation. For example, when the auto-focus operation is to be executed using an image on a film shown in FIG. 10, if a line L2 with no image is read, the auto-focus operation is disabled. Since a line L1 contains more alteration points than a line L3, the auto-focus operation can be made with higher reliability and precision if the line L1 is used.

Figure 10:
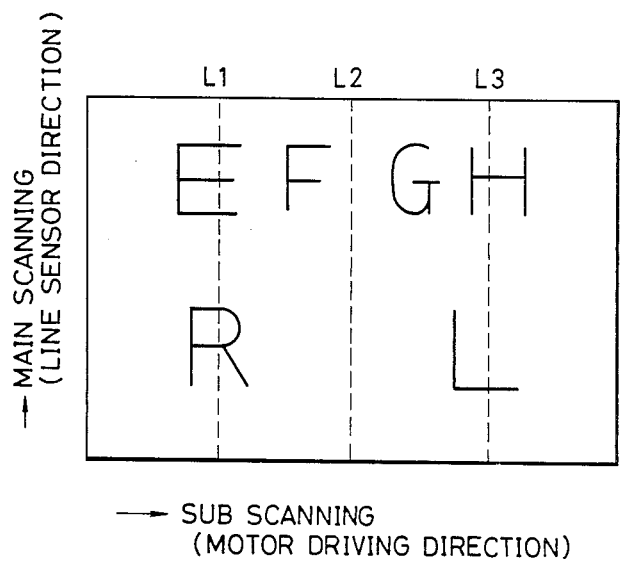
FIG. 10 is an illustration showing an image on the microfilm.

More specifically, when the auto-focus operation is performed using the film containing the image shown in FIG. 10, the image sensor CCD must be moved to a line position having image data sufficient to allow auto-focus measurement prior to the operation.

In order to realize this, a possible focus measurement value which is the lower limit of enabling the auto-focus operation is determined in advance, and the system controller 17 fetches the binary alteration point count value of each line using the counter 20 while the image sensor CCD is being moved by the motor M. The system controller 17 thus fetches the count values at a large number of points on the film image, and causes the image sensor CCD to be in a position at which it can read an image corresponding to the maximum count value. At that point, the autofocus operation is performed based on the image data on the corresponding line.

Figure 11:
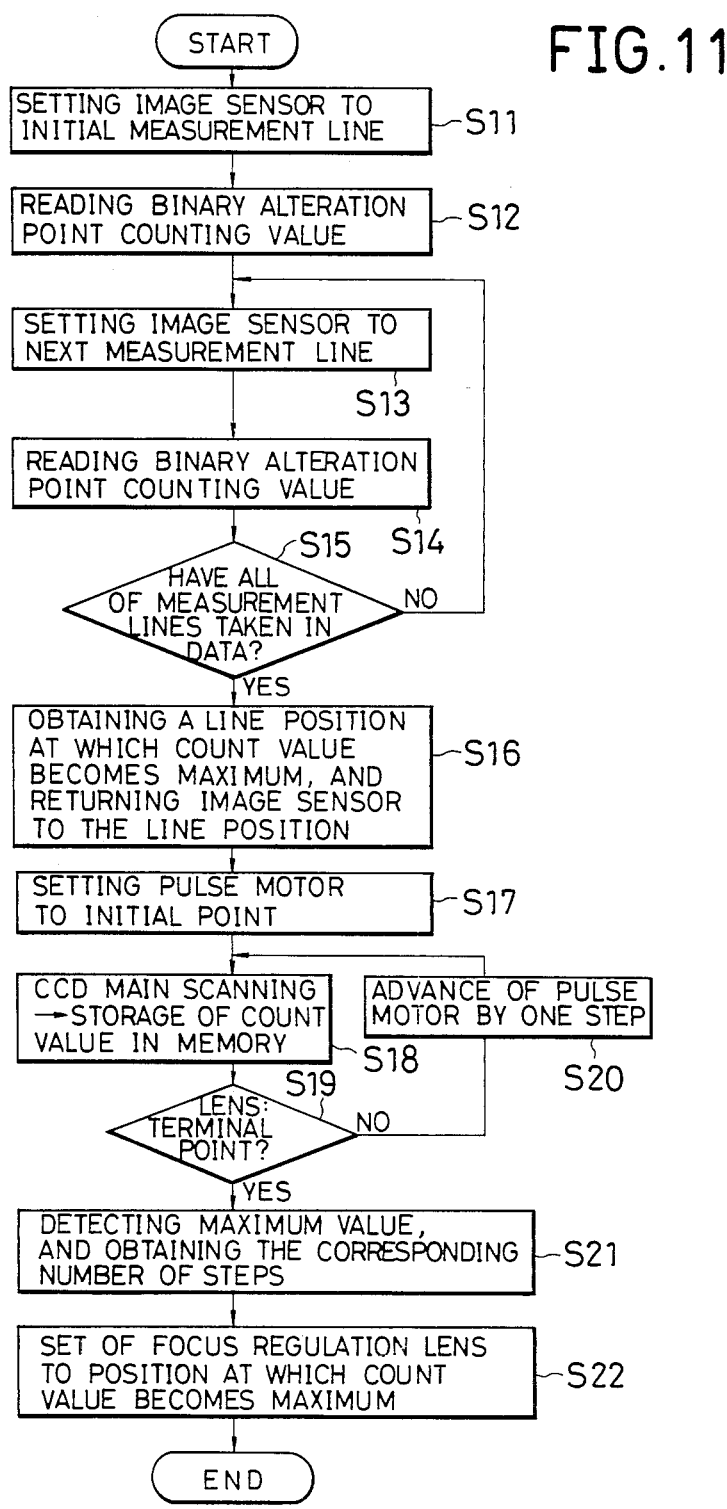
FIGS. 11, 12, 14, 16, and 23 are flow charts for explaining a control sequence of an auto-focus operation.

FIG. 11 is a flow chart showing a control sequence of the system controller for the auto-focus operation.

When the auto-focus mode is selected by the auto-focus mode switch 21, prior to image reading, the image sensor CCD is moved to a predetermined initial position on an initial measurement line by the sub-scanning motor M for the auto-focus operation, in step S11. At this time, the lens FC is set at an experimentally determined pseudo in-focus position, and the binary encoding circuit 15 encodes the image signal into the binary signal using the threshold value TL.

After the 1-line image reading, the count value from the binary alteration point counter 20 is fetched in step S12. At the same time, a line position corresponding to the count value is also fetched. Note that the counter 20 counts alteration points of the image signal for each scanning operation of the image sensor CCD. In step S13, the image sensor CCD is moved to a scanning position on the next measurement line. In step S14, the count value of the counter 20 and the line position corresponding thereto are fetched. Next, it is checked in step S15 if fetching of the count values for all the measurement lines of the image on the microfilm F is completed. If NO in step S15, the image sensor CCD is moved to the next scanning position in step S13, and the count value is fetched in step S14. This operation is repeated until the count values for all the measurement lines are fetched.

After the count values for all the measurement lines are fetched, a maximum count value is obtained and the image sensor CCD is moved to the line position corresponding to the maximum count value, in step S16. Then, the image sensor CCD is held in position in an image-read standby state. Thereby, the image sensor CCD can scan a position (image portion) suited for the auto-focus detection.

In step S17, the pulse motor for driving the lens FC is driven to set it at an initial position. In step S18, the image senosr CCD performs the main scanning operation. In this case, the sub-scanning movement of the image sensor CCD is not performed. The count value (the number of focusing data) is fetched for each 1-line main scanning operation of the image sensor CCD, and is stored in the memory in the CPU. At this time, the step number of the pulse motor provided in the lens driving device 18 is also stored in the memory. It is then checked in step S19 if the lens FC is at a terminal position. If NO in step S19, the flow advances to step S20, and the pulse motor for the lens FC is rotated by one step to move the lens FC toward the terminal position by one step. Again in step S18, the image sensor CCD is caused to perform the main scanning operation, and the count value corresponding to the focusing data is stored in the memory. This loop is repeated until the lens FC reaches the terminal position, so that the count values of the counter 20 obtained during a plurality of of main scanning operations at corresponding steps from the initial position to the terminal position are stored in the memory.

After the lens FC has reached the terminal position, the flow advances to step S21. In step S21, the maximum count value stored in the memory is retrieved, and the step number of the pulse motor corresponding to the maximum value is also obtained. In step S22, the pulse motor of the device 18 is driven so that the lens FC is moved to a position corresponding to the obtained step number. Thereby, the lens FC is set at a just-focus position.

With the arrangement of this embodiment, focus measurement can always be performed on a line having stable image data (suitable for the auto-focus detection) regardless of the type of film or image.

In this embodiment, the image sensor having a light receiving element array is used as an image reading sensor. Instead, another type of imaging element or a two-dimensional sensor (FIG. 8) can be used. Instead of driving the lens FC for the focusing operation, another lens, the lamp, the microfilm, or the image sensor can be driven. In addition, measurement of binary alteration points can be performed either while driving the sub-scanning motor or after it is stopped. Moreover, the microfilm can be moved instead of moving the image sensor.

When focusing precision in a single image line is insufficient, the focus measurement is performed using a plurality of lines having count values larger than the possible focus measurement value, and these values can be averaged to improve the precision.

The present invention is not limited to application to the microfilm, but can be applied to 35-mm film, X-ray films, and the like.

In this way, an optimal line for an auto-focus operation is detected from an image to be read, and the auto-focus operation can be executed at the position of the optimal line. However, in order to detect the optimal line, the count values of edges and corresponding line positions for a plurality of lines must be stored. In view of this, an arrangement with which the volume of storage data to be stored can be reduced and the same effect as described above can be obtained will now be described below.

The electrical and mechanical arrangement of this embodiment is the same as that shown in FIG. 9, and a control sequence of the system controller 17 differs.

In order to realize the above requirements, the system controller 17 fetches binary alteration point count value of each line through the binary alteration point counter 20 while moving the image sensor CCD at short intervals. After the binary alteration point count values on corresponding lines on part or all of a film image are fetched for as many points as possible, the maximum count value is obtained therefrom and is multiplied with a predetermined coefficient (e.g., 70%) to obtain a value Th.

The image sensor CCD is returned to the initial position to again fetch the binary alteration point count values while moving it at short intervals. When the count value exceeds the value Th, the sensor CCD is stopped, and the auto-focus operation is performed based on the image data on a line at that point.

The reason why the value Th is used for detecting an image line along which the auto-focus operation is to be performed is as follows. Each scanning position of the image sensor CCD will not coincide perfectly with a previous scanning position, and the resultant count values, therefore, vary for every scanning operation. Thus, the value Th is used to compensate for a variation in count value and to determine the position of the optimal line. Note that in this embodiment, the value Th is obtained by multiplying the maximum value obtained during the first scanning operation with the predetermined coefficient. Instead, the value Th can be selected from values within a predetermined range defined by the upper and lower limits of the maximum value, or can be an average value of some largest values.

Figure 12:
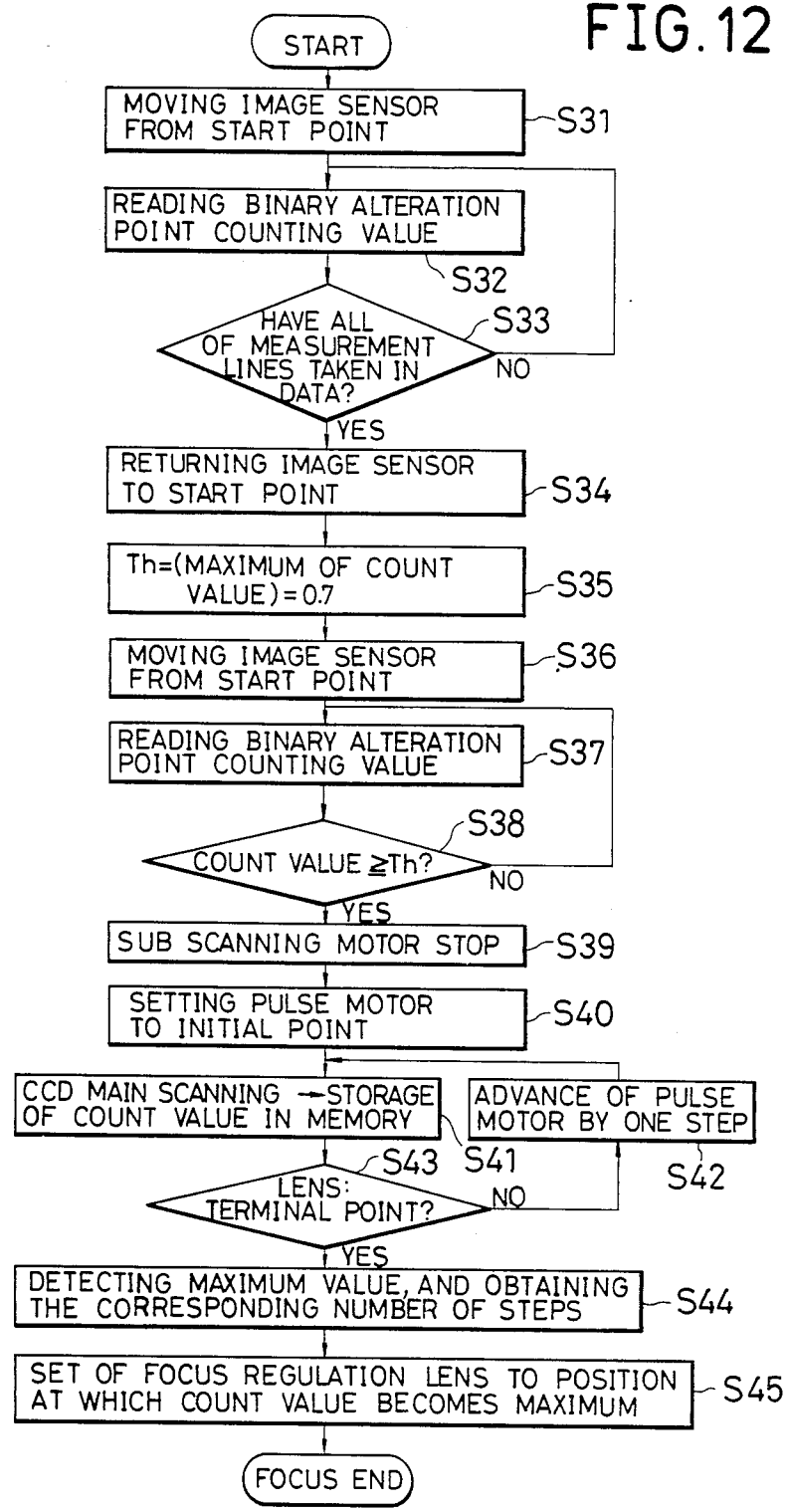

FIG. 12 is a flow chart showing a control sequence of the system controller for the abovementioned auto-focus operation.

When the auto-focus mode is selected by the auto-focus mode switch 21, prior to image reading, the image sensor CCD is moved to a predetermined initial position on an initial measurement line by the sub-scanning motor M for the auto-focus operation, in step S31. At this time, the lens FC is set at an experimentally determined pseudo in-focus position, and the binary encoding circuit 15 encodes the image signal into the binary signal using the threshold value TL.

After the 1-line imgae reading, the count value from the binary alteration point counter 20 is fetched in step S32. Note that the counter 20 counts alteration points of the image signal for each scanning operation of the image sensor CCD, as previously described. It is then checked in step S33 if fetching of the count values of all the measurement regions of an image on the microfilm F is completed. If NO in step S33, the image sensor CCD successively fetches the count value from the counter 20 again in step S32, and repeats this operation until the count values of all the measurement regions of the image is fetched.

After the count values for respective scanning operations of all the measurement regions are fetched, the image sensor CCD is returned to the initial position and the maximum count value is obtained and is then multiplied with the predetermined coefficient (in this embodiment, 0.7) to obtain the value Th, in step S32.

In step S36, the image sensor CCD is started from the initial point by the sub-scanning motor M. After the 1-line image reading, the count value of the counter 20 is fetched in step S37. It is checked in step S38 if the fetched count value is larger than the value Th calculated in step S35. If NO in step S38, the count value of the next line is fetched from the counter 20, and this operation is repeated until the count value exceeds the value Th. If the line having the larger count value than the value Th is found, the sub-scanning motor M is stopped in step S39 to fix the image sensor CCD in position. Thereby, the image sensor CCD can scan a position suited for the auto-focus detection.

Next in step S40, the pulse motor for the lens FC is driven to set the lens FC at its initial position. In step S41, the main scanning operation of the image sensor CCD is performed. At this time, the subscanning movement of the image sensor CCD is not performed. The count value (the number of focusing data) is fetched for each 1-line main scanning operation of the image senso CCD, and is stored in the memory in the CPU. At this time, the step number of the pulse motor provided in the lens driving device 18 is also stored in the memory. It is then checked in step S43 if the lens FC is at a terminal position. If NO in step S43, the flow advances to step S42, and the pulse motor for the lens FC is rotated by one step to move the lens FC toward the terminal position by on step. Again in step S41, the image senso CCD is caused to perform the main scanning operation, and the count value corresponding to the focusing data is stored in the memory. This loop is repeated until the lens FC reaches the terminal position, so that the count values of the counter 20 obtained during a plurality of main scanning operations at corresponding steps from the initial position to the terminal position are stored in the memory.

After the lens FC has reached the terminal position, the flow advances to step S44. In step S44, the maximum count value stored in the memory is retrieved, and the step number of the pulse motor corresponding to the maximum value is also obtained. In step S45, the pulse motor of the device 18 is driven so that the lens FC is moved to a position corresponding to the obtained step number. Thereby, the lens FC is set at a just-focus position.

In this way, reliable focusing is enabled at a position of an image suitable for auto-focus detection. Therefore, the apparatus free form erroneous focusing operation can be provided.

The auto-focus operation is executed based on the count values of the alteration points of the image signal. However, some images recorded on the microfilms may have a very small number of the alteration points.

In such an image, a difference between the numbers of edges of the in-focus position and out-of-focus position is small, and erroneous auto-focus operation may often be performed.

In this case, an operator preferably selects not the auto-focus mode, but a manual focus mode.

An arrangement free from an unnecessary image reading operation when an image unsuitable for the auto-focus operation is to be read manually will be described below.

Figure 13:
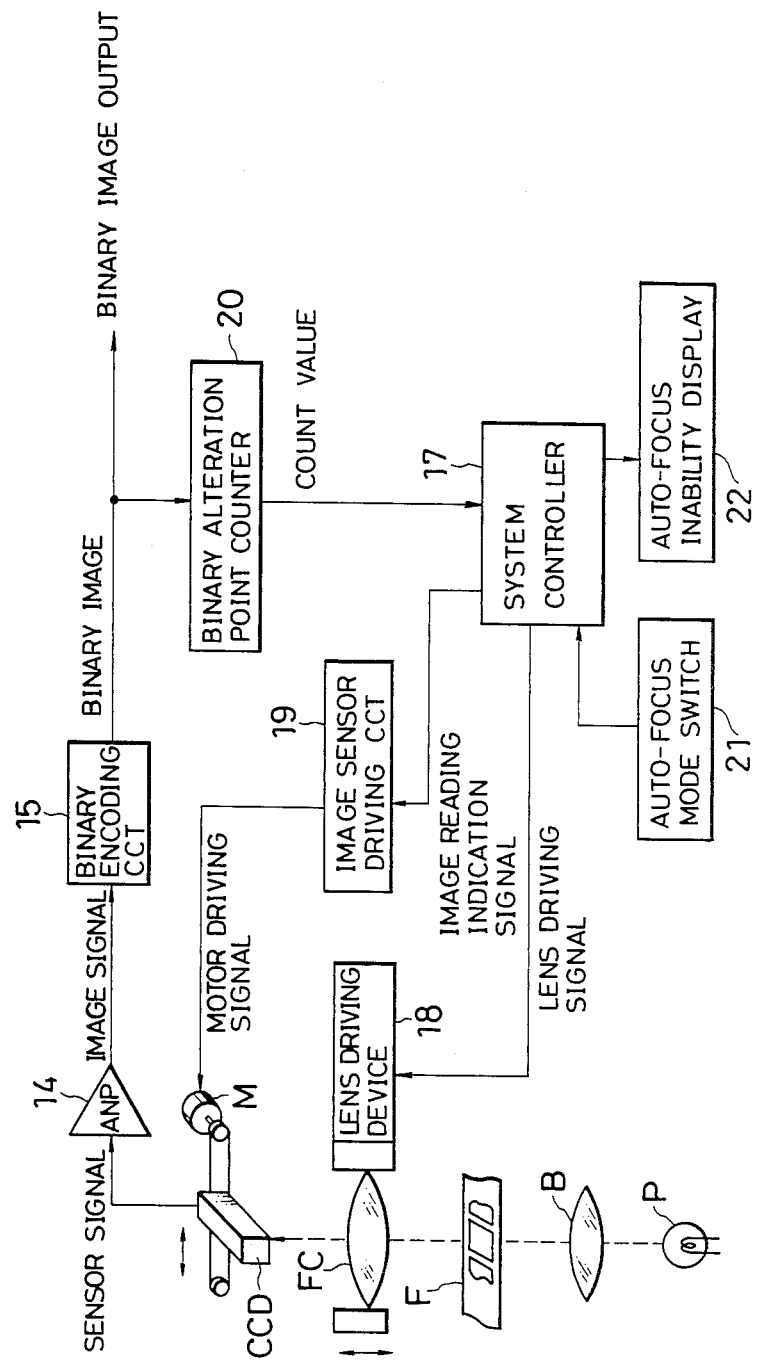

FIG. 13 shows an arrangement for the autofocus operation according to still another embodiment of the present invention. The arrangement in FIG. 13 is basically the same as that in FIG. 9, except for a provision of an auto-focus inability display 22 and a control sequence of the system controller 17. The same reference numerals in FIG. 13 denote the same parts as in FIG. 9, and a detailed description thereof will be omitted.

The auto-focus inability display 22 signals to an operator in the auto-focus mode that the auto-focus operation is disabled for some reason. When the display 22 displays an auto-focus inability state, the operator cancels the auto-focus mode by the mode switch 21, and can execute a manual focusing operation.

As previously described, when the auto-focus operation is to be executed with respect to a film shown in FIG. 10, the image sensor CCD must be set at a line position, having image data which enables the auto-focus measurement, prior to the auto-focus operation.

In order to realize this, a possible focus measurement value, which is the lower limit for enabling the auto-focus operation, is set in advance. The system controller 17 fetches binary alteration point count value of each line form the binary alteration point counter 20 while allowing the sub-scanning motor M to move the image sensor CCD at short intervals. When the count value exceeds the possible focus measurement value, the sensor CCD is stopped, and the auto-focus operation is performed from that point based on the image data along the corresponding line.

Figure 14:
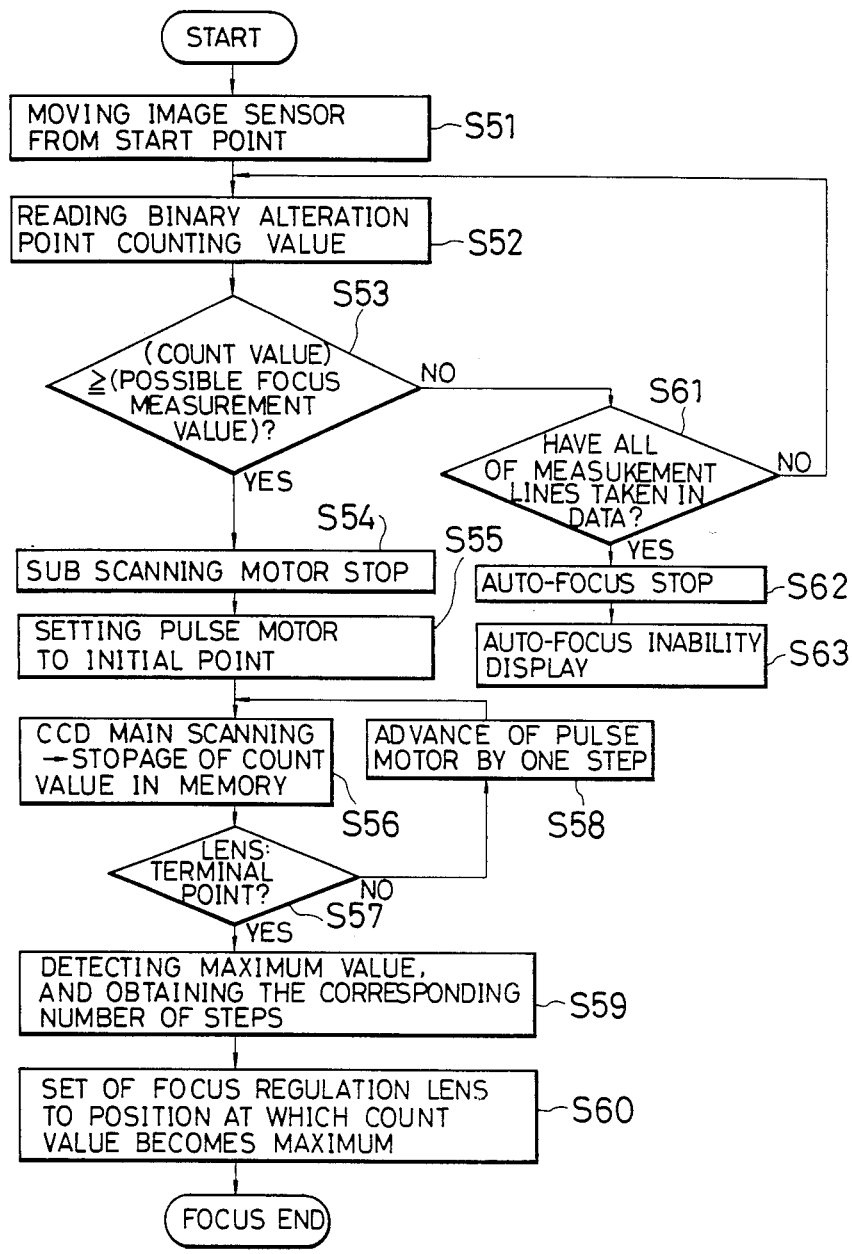

FIG. 14 is a flow chart showing a control sequence of the system controller 17 for the auto-focus operation.

When the auto-focus operation is selected by the mode switch 21, prior to image reading, the image sensor CCD is moved to a predetermined initial position on an initial measurement line by the sub-scanning mtoro M for the auto-focus operaiton, in step S51. At this time, the lens FC is set at an experimentally determined pseudo in-focus position, and the binary encoding circuit 15 encodes the image signal into the binary signal using the threshold value TL.

After the 1-line image reading, the count value from the binary alteration point counter 20 is fetched in step S52. Note that the counter 20 counts alteration points of the image signal for each scanning operaiton of the image sensor CCD. It is then checked in step S53 if the fetched count value is larger than a possible focus measurement value CT. If NO in step S53, it is checked in step S61 if fetching of the count values of all the measurement regions of an image on the microfilm F is completed. If NO in step S61, the count value is fetched from the counter 20 again in step S52, and the operaiton is repeated until the count value exceeds the count value CT.

If an image suitable for the auto-focus operation is set on the scanning position, a line having the count value larger than the value CT is found. When such a line is found, the image sensor CCD is fixed in position in an image reading standby state. Thereby, the image sensor CCD can scan a position suitable for the auto-focus detection.

In step S55, the pulse motor for the lens FC is driven to set the lens FC at its initial position. In step S56, the main scanning operation of the image sensor CCD is performed. In this case, the sub-scanning movement of the image sensor CCD is not performed. The count value (the number of focusing data) is fetched for each 1-line main scanning operation of the image sensor CCD, and is stored in the memory in the CPU. At this time, the step number of the pulse motor provided in the lens driving device 18 is also stored in the memory. It is then checked in step S57 if the lens FC is at a terminal position. If NO in step S57, the flow advances to step S58, and the pulse motor for the lens FC is rotated by one step to move the lens FC toward the terminal position by one step. Again in step S56, the image sensor CCD is caused to perform the main scanning operation, and the count value corresponding to the focusing data is stored in the memory. This loop is repeated until the lens FC reaches the terminal position, so that the count values of the counter 20 obtained during a plurality of main scanning operations at corresponding steps from the initial position to the terminal position are stored in the memory.

After the lens FC has reached the terminal position, the flow advances to step S59. In step S59, the maximum count value stored in the memory is retrieved, and the step number of the pulse motor corresponding to the maximum value is also obtained. The pulse motor of the device 18 is then driven so that the lens FC is moved to a position corresponding to the obtained step number. Thereby, the lens FC is set at a just-focus position.

In the scanning position detection operation for focus detection in steps S52 and S53, when an appropriate scanning position (i.e., the scanning position having the larger count value than the count value CT) cannot be detected until the measurement of the count values of all the measurement regions is completed, it is determined that the image is unsuitable for the auto-focus operation. Then, the flow advances from step S61 to step S62, and the auto-focus operation is interrupted. In step S63, the auto-focus inability display 22 displays that message.

Note that the auto-focus is also disabled when an image is not precisely at a scanning position, or when a malfunction of the image sensor, contamination of lenses or mirrors, abnormality of the amplifier 14 or the binary encoding circuit 15, and the like occurs.

With the arrangement of this embodiment, focus measurement can always be performed on a line having stable image data. When the auto-focus operation is disabled for some reason, it is interrupted, and this is signaled to the operator. Therefore, when the auto-focus operation cannot be performed, the operator can execute manual focusing.

In this embodiment, the image sensor having a light receiving element array is used as an image reading sensor. Instead, another type of imaging element or a two-dimensional sensor can be used. Instead of driving the lens FC for the focusing operation, another lens, the lamp, the microfilm, or the image sensor can be driven. In addition, measurement of binary alteration points can be performed either while driving the sub-scanning motor or after it is stopped. Moreover, the microfilm can be moved instead of moving the image sensor.

When focusing precision in a single image line is insufficient, the focus measurement is performed using a plurality of lines having count values larger than the possible focus measurement value, and these values can be averaged to improve the precision.

The present invention is not limited to application to the microfilm, but can be applied to 35-mm film, X-ray films, and the like.

The focusing operation is executed based on the number of alteration points of the image signal, as described above. When the number of alteration points is below a predetermined value, the focusing operation is inhibited. Therefore, in an out-of-focus state, image reading will not be performed.

In this way, the auto-focus operation can be executed based on a change in level of an image scanning signal. As previously described, a base density or an image recording density (contrast) differs in accordance with manufacturers or the type of films.

A level or dynamic range of the scanning signal therefore differs in different films. In some films, level alteration points cannot be accurately detected based on a single threshold value.

An arrangement which is free form the above problem and allows reliable auto-focus operation regardless of the type of films will now be described.

Figure 15:
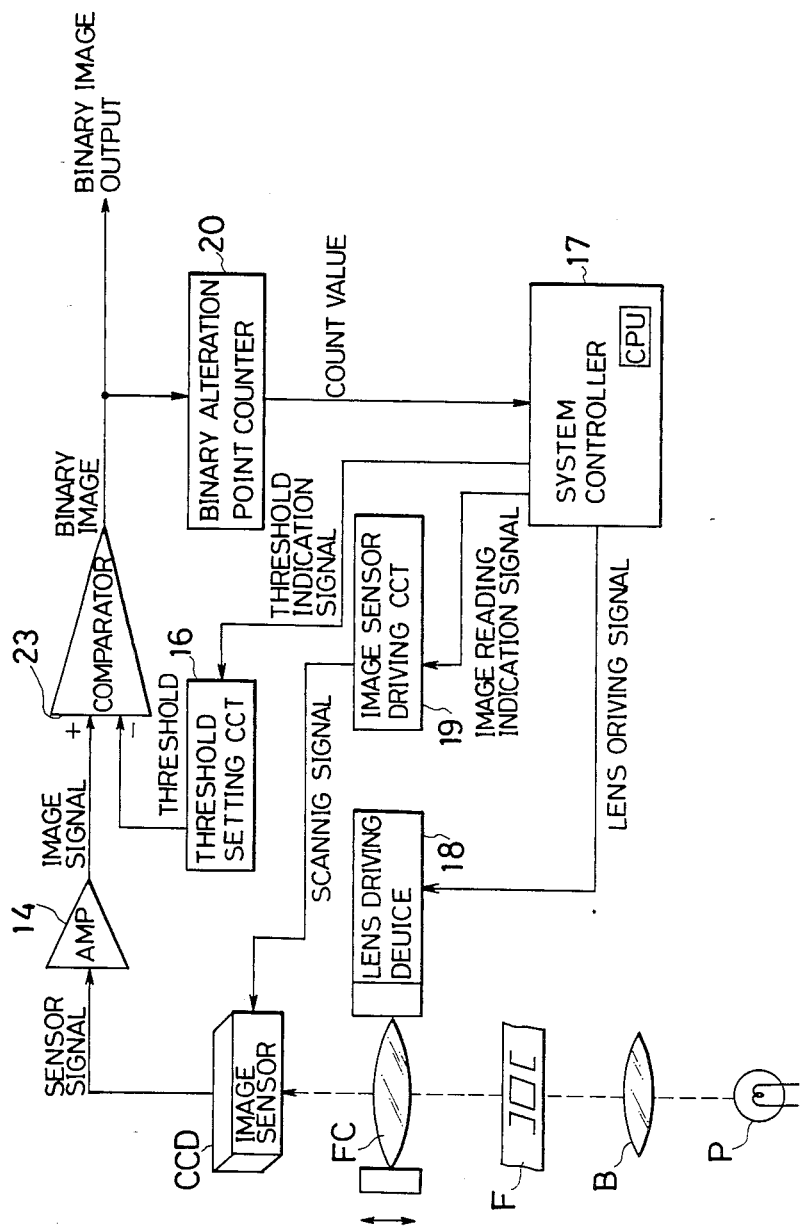

FIG. 15 shows a circuit arrangement for an auto-focus operation according to still another embodiment of the present invention. Note that the arrangement in FIG. 15 is basically the same as that shown in FIG. 9, except that a comparator 23 and a threshold setting circuit 16 for supplying a threshold value to the comparator 23 under the control of a system controller 17 are used instead of the binary encoding circuit 15, and a control sequence of the system controller 17 is different therefrom. The same reference numerals in FIG. 15 denote the same parts as in FIG. 9, and a detailed description thereof is omitted.

Light emitted from a light source P is focused by a condenser lens B, and is then transmitted through a microfilm F. Then, an image focused through an imaging lens FC is projected onto an image sensor CCD comprising a CCD element array.

The image sensor CCD scans an image by main and sub-scanning operations, converts it into an electrical sensor signal (i.e., an image signal) and supplies the signal to an amplifier 14. The comparator 23 compares the image signal supplied from the amplifier 14 with a threshold value signal from the threshold setting circuit 16 (to be described later) to obtain a binary image signal, which is supplied to a printer or an image memory (not shown). An apparatus which reliably performs the auto-focus operation based on the binary image signal will now be described.

In this embodiment, the number of alteration points (i.e., leading or trailing edges; to be referred to as focusing data hereinafter) of the binary image signal is counted in the same manner as in the previous embodiments. Based on the principle that an optimal focus measurement position for an image is obtained when a count value of the corresponding line is at maximum, a threshold value is changed between when a lens is moved near a just-focus position and when it is at an out-of-focus position. Data having different count values of the focusing data is obtained. Then, a threshold value for the image is set to correspond to the maximum count value based on these data, thus allowing appropriate auto-focus operation.

The system controller 17 comprising a central processing unit (CPU) supplies a drive signal to a lens driving device 18 to move the imaging lens FC in a direction indicated by arrows in FIG. 15, thus changing the lens position. At the same time, the controller 17 supplies an image reading indication signal to an image sensor driving circuit 19, which generates a scanning signal to cause the image sensor CCD to scan an image at that lens position.

In this embodiment, the position of the imaging lens FC is gradually changed by a drive signal from the system controller 17, and binary alteration points at respective positions on an identical scanning line scanned by the image sensor CCD are fetched by a binary alteration point counter 20. The count value is supplied from the counter 20 to the system controller 17, so that the maximum count value is obtained in the following manner.

When the threshold setting circuit 16 receives a threshold indication signal from the system controller 17, it changes a threshold value accordingly, and can continuously supply such a threshold value to the comparator 23.

An operation sequence of the system controller 17 will be described below. FIGS. 17(A) and 17(B) are graphs for explaining the relationship between the image signal and the threshold value respectively in the just-focus and out-of-focus states. Assume that three threshold values Ta, Tb, and Tc are set. In the just-focus state in FIG. 17(A), when the optimal threshold value Tb is set, the count number of focusing data obtained from the binary image signal is at maximum, and in the out-of-focus state in FIG. 17(B), the count value corresponding to the threshold value Tb is smaller than that in FIG. 17(A).

When the threshold value Ta is selected, the count value is small even in the just-focus state in FIG. 17(A). When the threshold value Tc is selected, the count value is small both in the just-focus and out-of-focus states in FIGS. 17(A) and 17(B).

FIGS. 18(A) to 18(C) show the relationship between the lens position and the count value respectively for the threshold values Ta, Tb, and Tc. When the optimal threshold value Tb is selected, the count value has a high peak and a steep curve, as shown in FIG. 18, and the peak value can be easily detected. Therefore, an optimal lens position JP can be obtained accurately. When the threshold value Ta is selected, the count value has a low peak value, as shown in FIG. 18(A). When the threshold value Tc is selected, the count value has a moderate curve, as shown in FIG. 18(C). In both the cases, it is difficult to detect the position JP with high precision.

The system controller 17 sets the imaging lens FC at a predetermined lens position (obtained experimentally near the in-focus position) prior to an auto-focus control sequence, and the count values are fetched while changing the threshold value through the threshold setting circuit 16.

After the image reading operation is completed, an optimal threshold value at which a maximum count value is obtained is retrieved, and the threshold setting circuit 16 supplies the retrieved threshold value to the comparator 23. Next, the counter 20 counts the alteration points while moving the imaging lens FC through the lens driving device 18, so as to set the imaging lens FC at a lens position corresponding to the maximum count value.

An operation sequence of the system controller 17 will now be described with reference to FIG. 16.

In step S71, the imaging lens FC is fixed at a predetermined position. In this state, in steps S72 and S73, the threshold value is changed while fetching the count values through the counter 20, and the count values corresponding to the respective threshold values are stored. It is checked in step S74 if the count values corresponding to all the threshold values are fetched.

If YES is obtained in step S74, the flow advances to step S75 to detect a threshold value T corresponding to a maximum count value. In step S76, the threshold value is set at "T". In steps S77 and S78, the lens FC is moved while fetching the count values through the counter 20. It is then checked in step S79 if the count value corresponding to all the lens positions are fetched.

If YES is obtained in step S79, the flow advances to step S80 to detect the lens position JP corresponding to the maximum count value. In step S81, the lens FC is set at the lens position JP, thus completing the focusing operation. Then, the image reading operation is initiated.

In the above description, the image sensor can be either a solid-state sensor or an imaging tube as in the previous embodiments. If the sensor is either a one-dimensional or two-dimensional sensor, the same effect can be obtained with the same procedure as previously described. Instead of driving the imaging lens, other lenses, the lamp, the microfilm, or the image sensor can be driven for the focusing operation. In addition, the system controller can comprise hardware enabling the above operation in place of the CPU. Moreover, the present invention is not limited to application to the microfilm, but can be applied to 35-mm film, X-ray films, and the like.

As described above, prior to the focusing operation, a threshold value for encoding an image signal is changed while a lens is fixed in position to count alteration points (e.g., leading or trailing edges) of the binary image signal, thus obtaining a threshold value corresponding to a maximum count value. The lens position is changed while setting a threshold value at the obtianed value to again obtain the count values. Then, a lens position corresponding to the maximum count value is detected, and focus measurement is performed so that the lens is positioned at the detected lens position. When the threshold value corresponding to the maximum count value is obtained, a condition which allows easy detection of a focal point with high precision is accomplished. When the lens is moved under this condition, a peak count value corresponding to the focal point can be precisely detected. Therefore, the auto-focus operation can be easily carried out accurately when compared with a conventional apparatus with which it is often difficult to obtain a precise just-focus position in accordance with the type or thickness of films, variation in the apparatus over time, or errors caused upon transportation and handling.

The auto-focus operation can be performed without setting a threshold value in advance, and an optimal threshold value can be selected during the operaiton. Therefore, focusing precision can be improved. In addition, this method can be applied directly to an automatic density adjusting apparatus.

Figure 16:
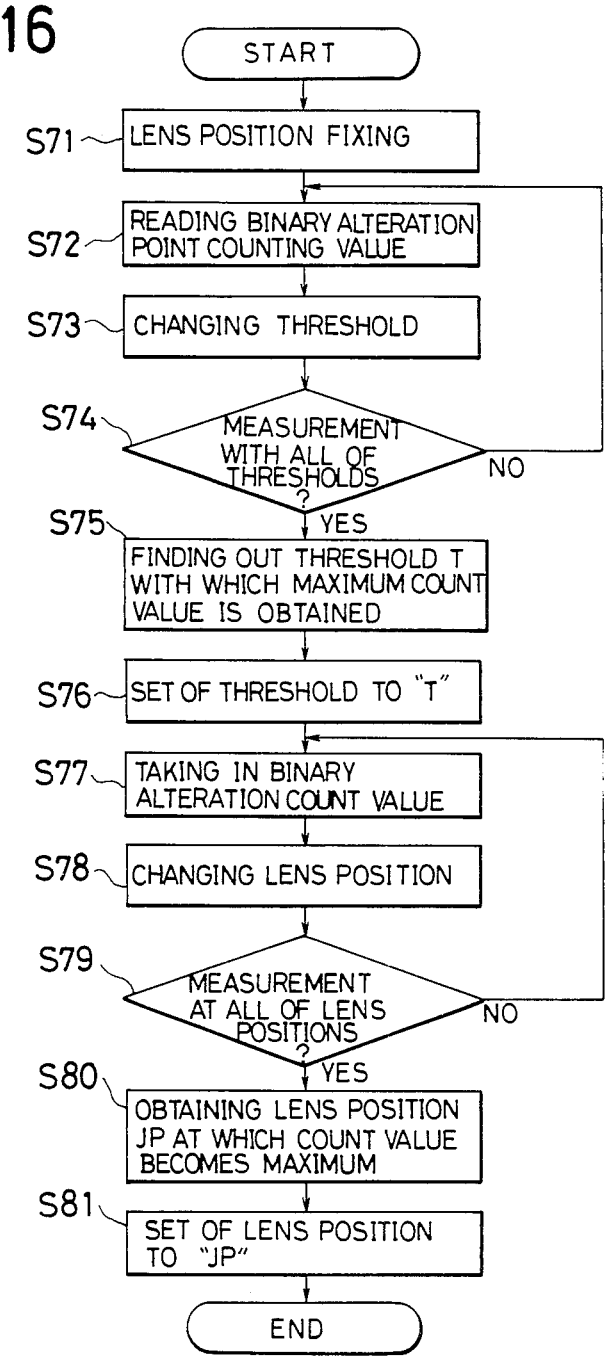

In the control sequence shown in FIG. 16, when a threshold value is set, the focusing lens FC is set near the just-focus position determined by experience to obtian a threshold value corresponding to a maximum count value, and the auto-focus operation is executed based on the threshold value. Although a threshold value suited for the auto-focus operation can be obtained with this method, the count value is considerably influenced by the content of an image. In some images, the count value will not change even if the lens position is changed. In this case, a reliable auto-focus operation is disabled.

Another arrangement which is free from the above problem and can set an optimal threshold value will now be described.

An electrical and mechanical arrangement is the same as that shown in FIG. 15, except for a control sequence of the system controller 17.

Prior to a series of auto-focus operation, the system controller 17 sets the lens FC at a given lens position (which is near the just-focus position obtained by experience), and fetches count values while changing a threshold value through the threshold setting circuit 16. This lens position is indicated by X in FIG. 19. The count-value data string obtained during scanning at that time is indicated by $x$ as shown in FIG. 20(A).

Figure 20A:
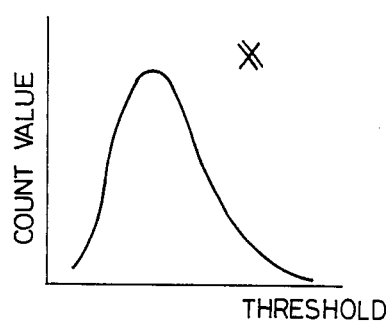
FIGS. 20(A), 20(B), and 20(C) are graphs showing the relationship between a threshold value and a count value.
Figure 20B:
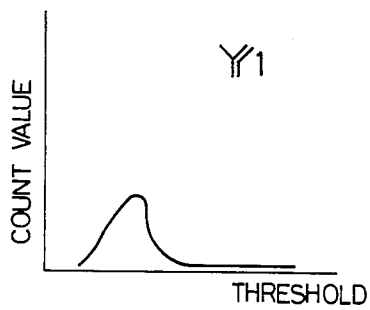

The lens FC is moved from the position X to Y1 separated by a given distance corresponding to value a1 to defocus an image. Similarly, count-value data is fetched while changing the threshold value, thus obtaining data string $y1$ shown in FIG. 20(B).

Figure 20C:
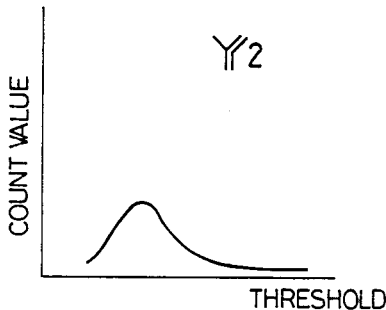

Next, the lens FC is moved from the position X2 to Y2 separated by a given distance corresponding to value a2 to defocus the image, and count-value data is fetched while changing the threshold value, thus obtaining data string Y2 shown in FIG. 20(C). Count-value data obtained by subtracting data string $y2$ from data string $x$ is added to another count-value data obtained by subtracting data string $y2$ from data string X to obtain data string $z$ shown in FIG. 21. From the graph of data string $z$, a threshold value corresponding to a maximum count value is SL. When the threshold value SL is selected, a difference between count values of just-focus and out-of-focus states is increased. Therefore, when the threshold value SL is used, a focusing error can be obtained from the count values with high precision. Note that FIG. 22 is a graph showing the relationship between the lens position and the count value.

Figure 21:
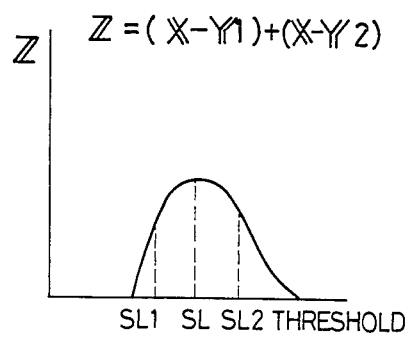
FIG. 21 is a graph showing the relationship between a threshold value and an arithmetic operation result.
Figure 22:
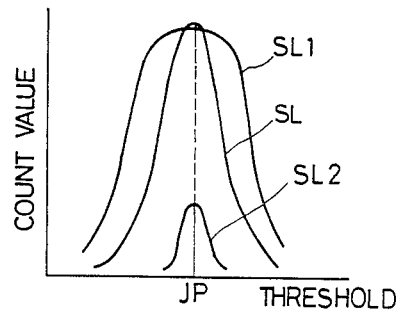
FIG. 22 is a graph showing the relationship between a lens position and a count value.

Assuming that a threshold value corresponding to a maximum value of $z$ is given by SL, and values before and after the value SL are given by SL1 and SL2 as in FIG. 21, FIG. 22 shows the count values corresponding to the lens positions when the threshold values are set at SL, SL1, and SL2, respectively. As can be seen from FIG. 22, when the threshold value SL is selected, a curve has a sharp top, and an optimal just-focus position JP can therefore be easily obtained with high precision.

Figure 23:
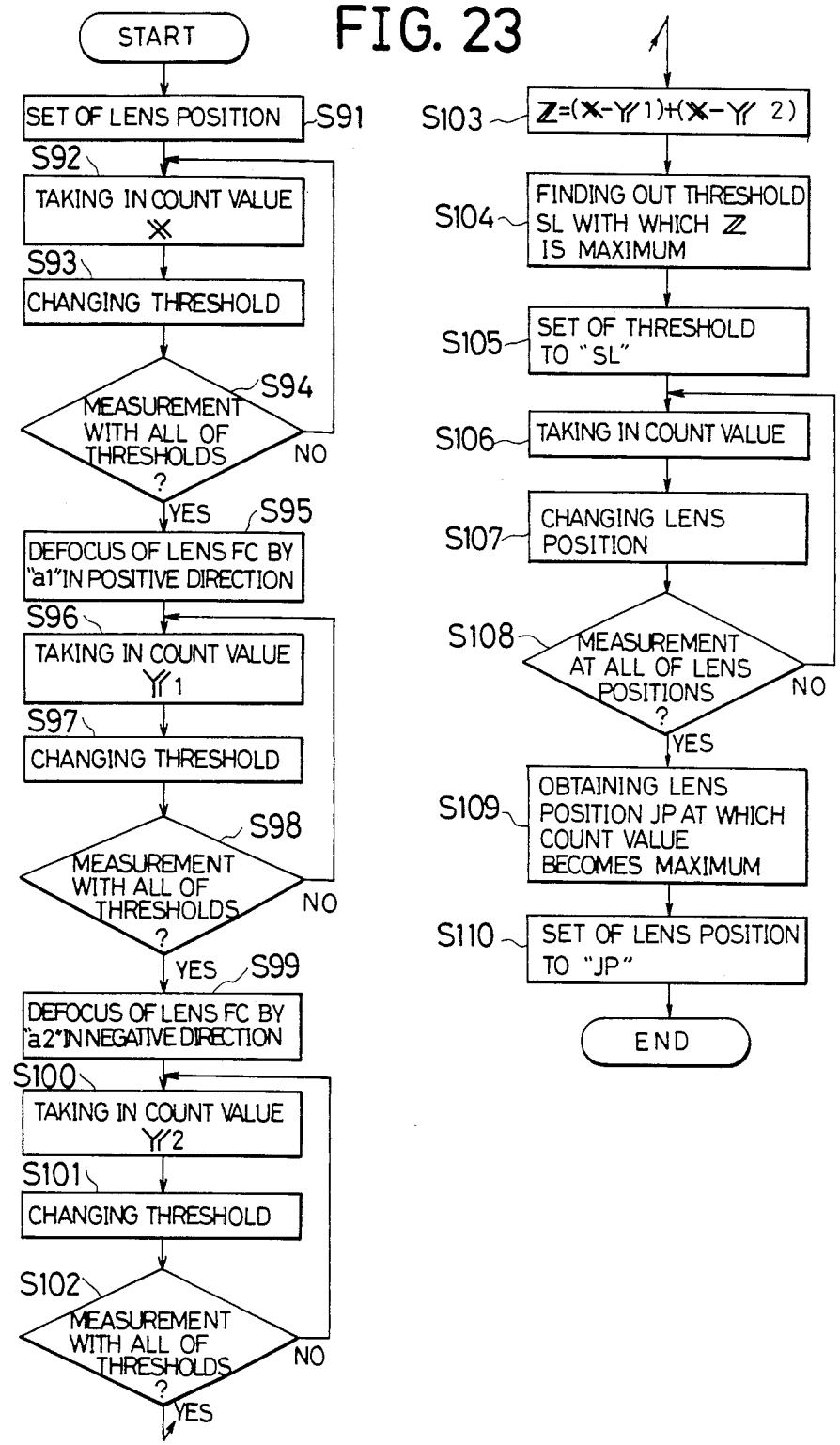

An auto-focus operation sequence of the system controller 17 will be described with reference to FIG. 23.

In step S91, the focusing lens FC is set at a predetermined position (the position X in FIG. 19), and in step S92 and S93, the count values are fetched through the counter 20 while changing the threshold value through the threshold setting circuit 16, thus storing the count values corresponding to respective threshold values. It is then checked in step S94 if the count values corresponding to all the threshold values are fetched. If the count-value data $x$ corresponding to all the threshold values is obtained, the flow advances to step S95, and the focusing lens FC is moved by the distance corresponding to the value a1 in the positive direction to defocus an image.

The same operation as in steps S92 to S94 is repeated through steps S96 to S98 to obtain the count-value data $y1$ corresponding to all the threshold values. Then, the flow advances to step S99, and an image is defocused by the distance corresponding to the value a2 in the negative direction.

The same operation as in steps S96 to S98 is repeated through steps S100 to S102 to obtain the count-value data $y2$ corresponding to all the threshold values. Next, in step S103, $z = (x - y1) + (x - y2)$ is calculated, and in step S104, the threshold value SL corresponding to a maximum value of $z$ is found. In step S105, the threshold value is set at SL.

The flow then advances to step S106, and the count values of the binary alteration points at the threshold value SL are fetched from the counter 20. Next, the flow advances to step S107, and the focusing lens FC is moved. Steps S106 and S107 are repeated until the count values corresponding to all the lens positions are obtained in step S108. If YES is obtained in step S108, the flow advances to step S109, and the lens position JP corresponding to the maximum count value is retrieved from the result in step S108. In step S110, the focusing lens FC is moved to the lens position JP, thus completing the auto-focus operation.

In the above description, the image sensor can be a solid-state sensor or an imaging tube as in the previous embodiments, and if the sensor is a one- or two-dimensional sensor, the same effect can be obtained with the same procedure. Instead of driving the focusing lens, other lenses, the lamp, the microfilm, or the image sensor can be driven for the focusing operaiton. In addition, the system controller can comprise hardware enabling the above operation in place of the CPU. Moreover, the present invention is not limited to application to the microfilm, but can be applied to 35-mm film, X-ray films, and the like.

As described above, a threshold value is changed between a position near the just-focus position and at an out-of-focus position to measure a change in count values. Then, a threshold value which makes maximum a difference between the count values at both the positions is obtained. Thereby, an optimal threshold value for the auto-focus operation, which has a significant change in count values with respect to a change in lens positions, can be obtained.

The lens can therefore be reliably set at the just-focus position by the auto-focus operation, and auto-focus precision and reliability can be greatly improved when compared with a conventional apparatus.

The auto-focus operation can be performed without setting a threshold value in advance, and an optimal threshold value corresponding to an image content can be set. Therefore, focusing precision and reliability can be improved, and the apparatus can be applied directly to an automatic density adjusting apparatus.

In the above embodiment, the auto-focus operation is performed based on a count value of alteration points of a scanned image signal.

Another arrangement for an auto-focus operation with another method will be described.

Another arrangement of an apparatus for electronically scanning an image on a microfilm through an image sensor will now be described with reference to FIG. 24.

An image on a microfilm F placed on an image reading apparatus 46 is irradiated with light emitted from a light source 42 through a lens 43 and guided at a scanning position by a mirror 44. Light transmitted through the microfilm F is reflected by a half mirror 49 through a focusing lens 47, and is guided onto a linear image sensor (e.g., CCD) 50 consisting of a plurality of light receiving elements.

The image sensor 50 is fixed on a carriage 54, which is movable in a sub-scanning direction along shafts 52 and 53 by a motor 58, pulleys 55 and 56, and a wire 57, thus scanning an entire projected image f line by line.

The focusing lens 47 is moved vertically upon rotation of a stepping motor 41 provided with an eccentric cam. The light passing through the half mirror 47 is guided onto a focus detector 30, and the stepping motor 41 is operated in accordance with the output from the detector 30, thus enabling the auto-focus operation.

The auto-focus operation for reading the image on the microfilm F will now be described.

Figure 25:
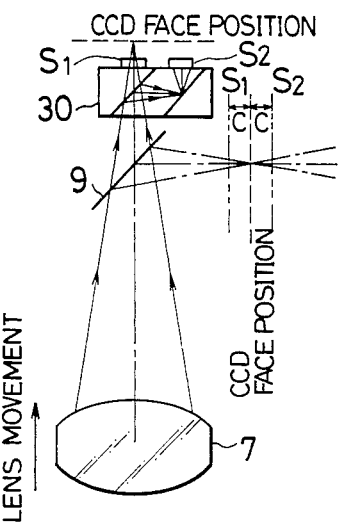
FIG. 25 is an illustration for explaining the principle of a focus detector.
Figure 26:
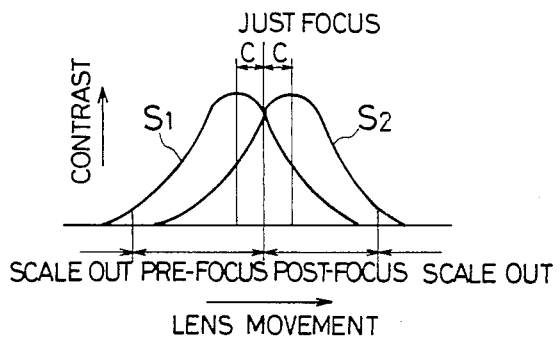
FIG. 26 is a graph showing a calculated value for an output to be generated from the focus detector.

FIG. 25 shows an arrangement of the focusing lens 47, the half mirror 49, and the focus detector 30. The light emerging from the half mirror 49 is partially guided onto the detector 30. The detector 30 is provided with a so-called beam splitter acting as a prism, which divides incident light to have two optical path lengths. A image sensor $S_1$ is provided at a short optical path length side, and a image sensor $S_2$ is provided at a long optical path length side. When the stepping motor 41 is rotated, the lens 47 is moved vertically upon operation of the eccentric cam thereof. In theory, ideal output signals from the image sensors $S_1$ and $S_2$ are calculated as contrast signals with respect to a position of the lens 47, as shown in FIG. 26. When the image sensors $S_1$ and $S_2$ respectively detect the contrast values in accordance with specific phase distributions, as shown in FIG. 26, the midpoint (neutral point) between lens positions corresponding to the maximum outputs form the image sensors $S_1$ and $S_2$ indicates the in-focus position.

Figure 27:
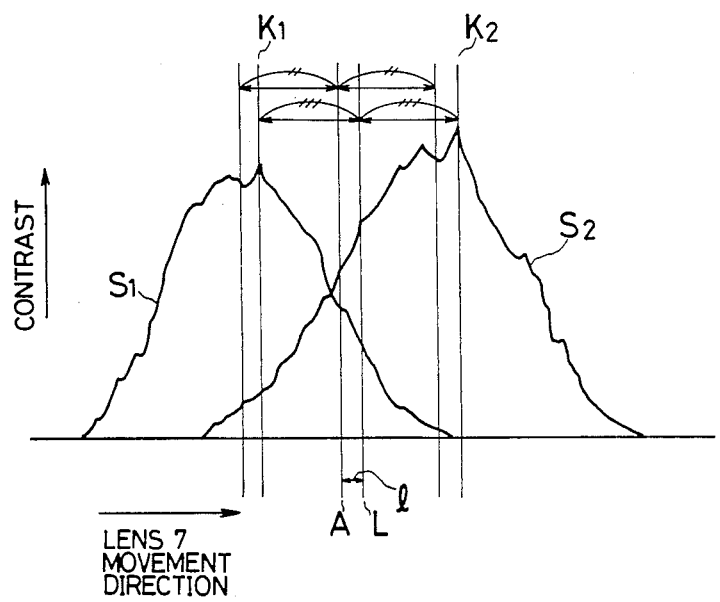
FIG. 27 is a graph showing an actual output from the focus detector.

However, in practice, when the stepping motor 41 is driven to move the lens 47, the output signals from the image sensors $S_1$ and $S_2$ undesirably have a plurality of peak values, as shown in FIG. 27. This is caused such that various noise components (e.g., vibration noise from the stepping motor 41, a change in power source voltage upon driving of the stepping motor 41, ripple components generated from the power source, a noise from semiconductors of the image sensors $S_1$ and $S_2$, an external electrostatic or discharge noise, an electromagnetic noise, and so on) are superimposed on the output signals from the image sensors $S_1$ and $S_2$.

Referring to FIG. 27, a lens position L defined by maximum contrast values $K_1$ and $K_2$ from the image sensors $S_1$ and $S_2$ is defocused from a true just-focus position A defined by true maximum values $J_1$ and $J_2$ by l, if the maximum values $K_1$ and $K_2$ are affected by the noise components.

In order to eliminate the influence of the noise components from the outputs from the image sensors $S_1$ and $S_2$, a data retrieving operation for focusing is repeated a plurality of number of times.

More specifically, the focus detecting operation is performed at least twice to obtain an average value of the results, thus improving focus detection precision. Therefore, the auto-focus operation can be performed with high reliability.

Figure 28:
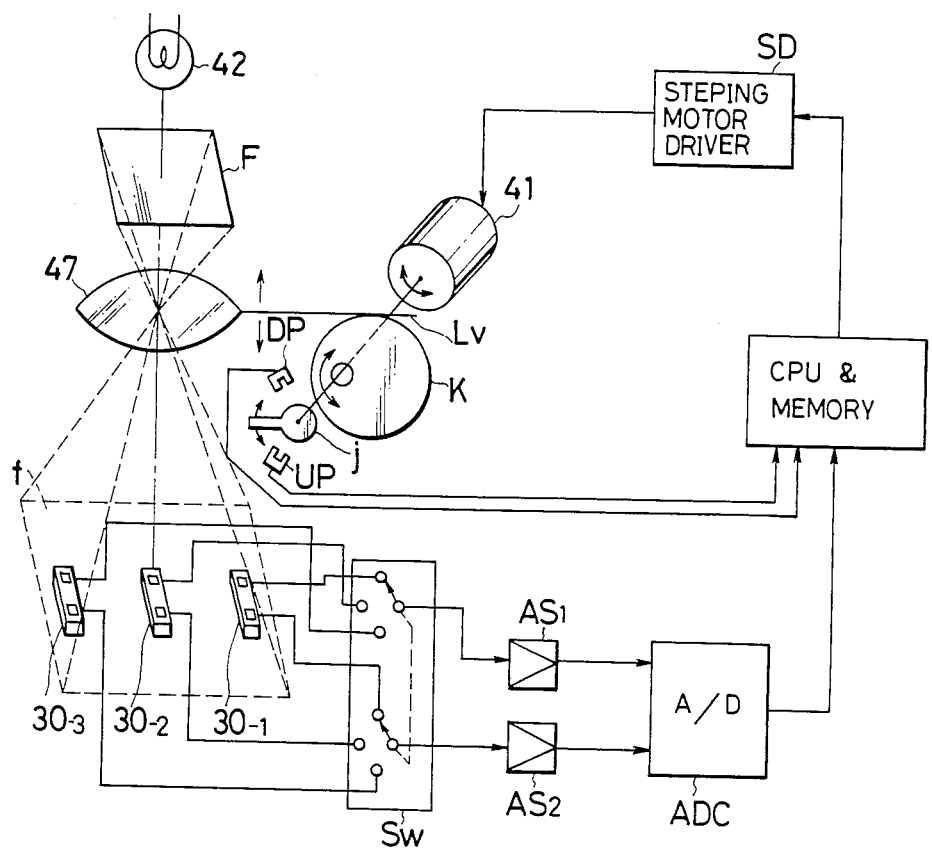
FIG. 28 is a block diagram of a circuit configuration for detecting a focal point.

FIG. 28 is a block diagram of an arrangement allowing the above focus detecting operation. Referring to FIG. 28, the microfilm F contains an image, and is irradiated with light emitted from the light source 42. The lens 47 is moved vertically through a lever LV upon rotation of the stepping motor 41 provided with an eccentric cam K under the control of a CPU, thus realizing the focusing operation. A rotation-type light shielding plate i is arranged on the shaft of the stepping motor 41. When the lens 47 reaches its uppermost position, the plate i is detected by a photo-interrupter UP, and when reaches its lowermost position, the plate i is detected by a photointerrupter DP, thus supplying a detection signal to the CPU.

Figure 24:
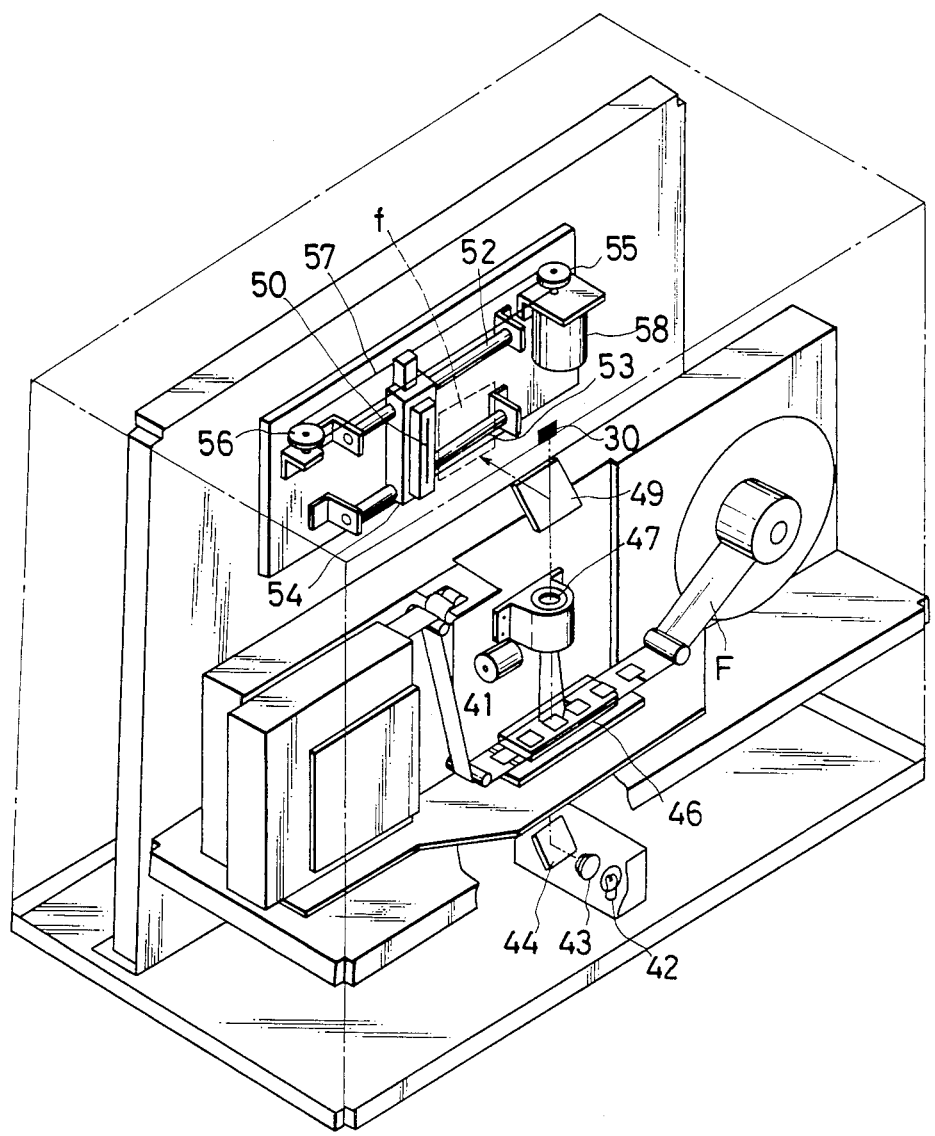
FIG. 24 is a perspective view of another arrangement of a microfilm reader.

A projected image plane f is at a position of the same optical path length as that of the light receiving surface position of the image sensor 50 in FIG. 24. At that position, focus detectors 30-1, 30-2, and 30-3 each having a beam splitter and two image sensors (FIG. 25) are arranged. In this case, at least one focus detector need be provided, and a switch SW is provided so that a position having a larger image contrast can be selected in accordance with conditions of an image.

An output from any one of the detectors 30-1, 30-2, and 30-3 selected by the switch SW is amplified by amplifiers $AS_1$ and $AS_2$, is then converted into a digital value consisting of a given number of bits by an A/D converter ADC, and is input to the CPU. The CPU obtains an optimal lens position based on the digital value, and operates a stepping-motor driver SD accordingly to drive the stepping motor 41, thereby moving the lens 47 to the optimal focusing position.

Figure 29:
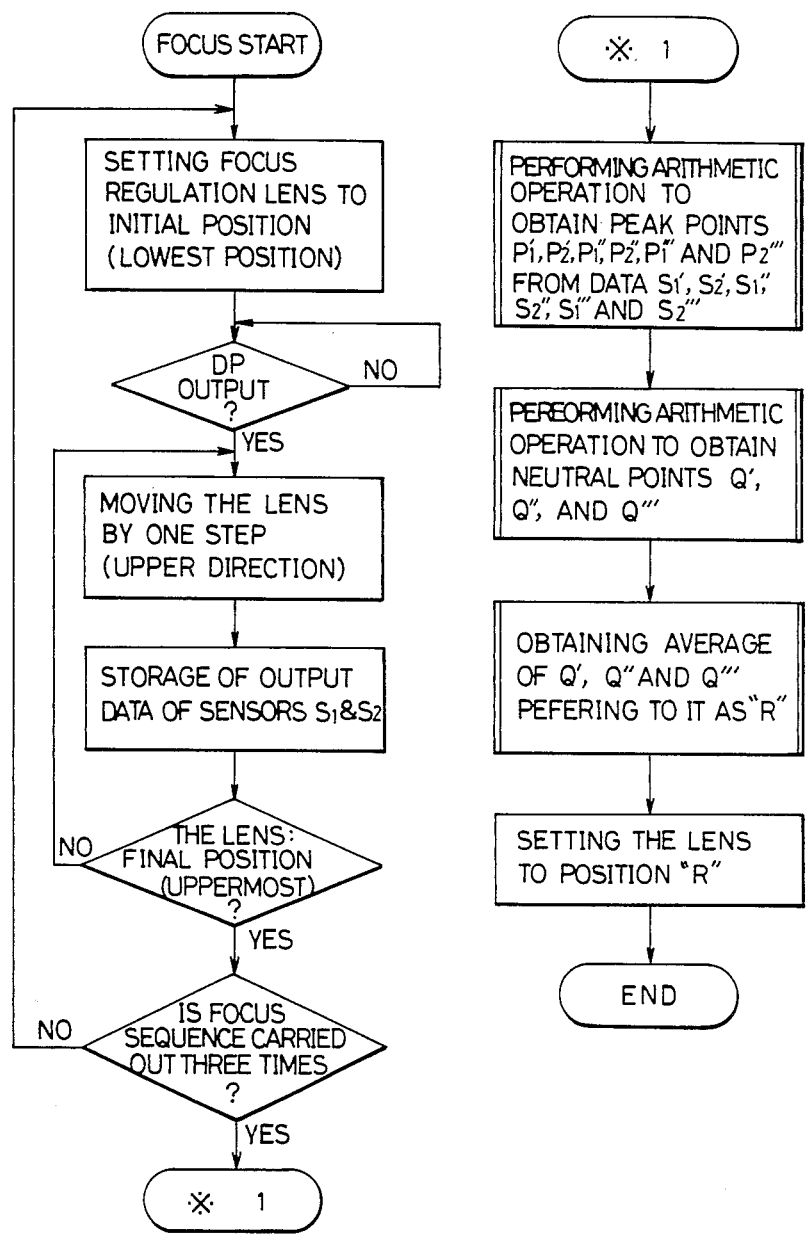
FIG. 29 is a flow chart for explaining a control sequence of the focus detection.
Figure 30:
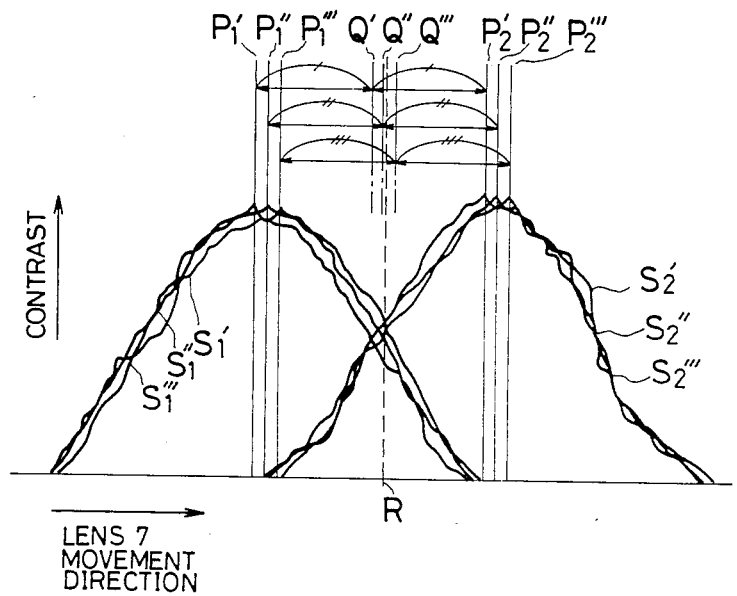
FIG. 30 is a graph of an output when the focal point is determined in accordance with the sequence shown in FIG. 29.

FIG. 29 is a flow chart showing an operation sequence of the CPU when the focusing position with the arrangement shown in FIG. 28, in which a focus detecting operation based on the outputs from the image sensors $S_1$ and $S_2$ of the focus detector 30 is performed three times. FIG. 30 shows data obtained when the lens 47 is reciprocated three times.

Upon reception of an instruction for the auto-focus operation, the CPU causes the stepping motor driver SD to set the lens 47 at the lowermost position. If the output from the photo-interrupter DP is detected to indicate that the lens 47 is at its lowermost position, the stepping motor 41 is operated by one step to move the lens 47 upward, and the output signals from the image sensors $S_1$ and $S_2$ are stored in a memory incorporated in the CPU using the corresponding lens positions as addresses. Thereby, data corresponding to waveforms $S'_1$ and $S'_2$ shown in FIG. 30 is stored in the memory.

If the output from the photo-interrupter UP is detected to indicate that the lens 47 is at its uppermost position, the lens 47 is set at the lowermost position again, and the output signals $S''_1$ and $S''_2$ from the image sensors $S_1$ and $S_2$ are stored in the memory while moving the lens 47 upward.

In this way, data $S'_1$, $S'_2$, $S''_1$, $S''_2$, $S'''_1$, and $S'''_2$ corresponding to the lens positions are obtained through three focus detecting operations.

An arithmetic operaiton for obtaining lens positions $P'_1$ and $P'_2$ corresponding to the peak values of the data $S'_1$ and $S'_2$ is performed. Also, an arithmetic operation for obtaining lens positions $P''_1$, $P''_2$, $P'''_1$, and $P'''_2$ corresponding to the peak values of the data $S''_1$, $S''_2$, $S'''_1$ and $S'''_2$ is performed thus obtaining the lens positions $P'_1$, $P'_2$, $P''_1$, $P''_2$, $P'''_1$, and $P'''_2$ corresponding to the six peak values obtained through the three focus detecting operations.

A neutral point $Q'$ between the lens positions $P'_1$ and $P'_2$, a neutral point $Q''$ between the lens positions $P''_1$ and $P''_2$, and a neutral point $Q'''$ between the lens positions $P'''_1$ and $P'''_2$ are then obtained through a series of arithmetic operations. In this case, the points $Q'$, $Q''$, and $Q'''$ detected from the focus detecting operations contain errors due to various noise components. The three points $Q'$, $Q''$, and $Q'''$ are then added and averaged to obtain an averaged lens position R. Next, the stepping-motor driver SD is operated so that the lens 47 is positioned at the lens position R. As previously described, errors due to random-noise components can be eliminated by averaging the resultant data, and a true just-focus position can be virtually obtained.

Figure 31:
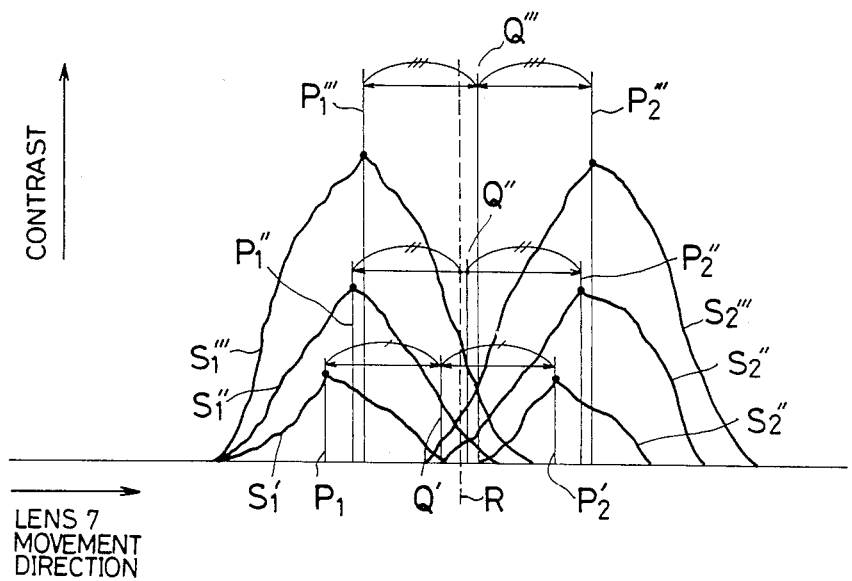
FIG. 31 is a graph of an output when focus detection according to still another embodiment of the present invention is performed.

FIG. 31 is a graph showing three focusing position data ($S'_1$, $S''_1$, $S'''_1$) obtained using a plurality of focus detectors 30 at 3 different positions, as shown in FIG. 28.

When points $Q'$, $Q''$, and $Q'''$ obtained by the three data in the same manner as above are averaged, even if an image is locally blurred with respect to an optical system, the lens can be set at an optimal focusing position with high precision.

In this embodiment, the beam splitter is used in the focus detector. The present invention is not limited to this, but can be applied to other focus detecting methods as in previously described methods in which a just-focus position is detected based on a CCD output.

When the focus detecting operation is performed four times or more, maximum and minimum values of the resultant values are excluded and the remaining values are averaged, thus realizing the focus detection with still higher precision.

The present invention can be applied to focus detection in image reading apparatuses of 35-mm films or X-ray films and in an apparatus for reading an image based on light reflected by an original.

As has been described above, the focus detecting operation is performed at least twice to obtian an average value, resulting in focus detection with high precision and reliability.

What is claimed is:

1. An auto-focus apparatus comprising:
exposure means for exposing an image recorded on a film;
scanning means for scanning the image on a line by line basis and producing binary image signals representing the image;
optical means for projecting image light from the film exposed with said exposure means onto said scanning means;
setting means for setting a scanning position of said scanning means so as to scan a predetermined line in the image;
counting means for counting the number of times there is a transition of the binary image signals produced from said scanning means when it scans the predetermined line; and
focusing means for focusing said optical means so that a count value of said counting means satisfies a predetermined condition.

2. An apparatus according to claim 1, wherein said focusing means focuses said optical means so that the count value of said count means is at a maximum value.

3. An auto-focus apparatus comprising:
scanning means for scanning an image on a line by line basis and producing binary image signals representing the image;
optical means for projecting the image onto said scanning means:
counting means for counting the number of times there is a transition of the binary image signals produced from said scanning means;
detection means for detecting an image line of the image with which a count value of said counting means satisfies a predetermined condition; and
focusing means for focusing said optical means based on the image signals obtained upon scanning by said scanning means of the image line detected by said detection means.

4. An apparatus according to claim 3, wherein said detection means detects the image line corresponding to a maximum count value of said counting means.

5. An apparatus according to claim 3, wherein said detection means detects the image line corresponding to a count value of said counting means which is larger than a predetermined value.

6. An apparatus according to claim 3, wherein said focusing means focuses said optical means so that the count value of said counting means satisfies a predetermined condition.

7. An apparatus according to claim 6, wherein said focusing means focuses said optical means so that the count value of said count means is at a maximum value.

8. An apparatus according to claim 3, wherein said optical means projects the image recorded on a film onto said scanning means.

9. An auto-focusing comprising:
scanning means for scanning an image on a line by line basis and producing binary image signals representing the image;
optical means for projecting the image onto said scanning means;
moving means for moving a scanning position of said scanning means;
detection means for detecting a position of scanning by said scanning means with which the image signals from said scanning means satisfy a predetermined condition; and
focusing means for focusing said optical means based on the image signals obtained upon scanning by said scanning means of an image line of the scanning position detected by said detection means.

10. An apparatus according to claim 9, further comprising counting means for counting the number of times there is a transition of the binary image signals produced from said scanning scanning means, and wherein said detection means detects a scanning position with which a count value of said counting means satisfies a predetermined condition.

11. An apparatus according to claim 9, further comprising counting means for counting the number of times there is a transition of the binary image signals produced from said scanning means, and wherein said focusing means focuses said optical means so that a count value of said counting means satisfies a predetermined condition 12. An apparatus according to claim 9, wherein said optical means projects the image recorded on a film onto said scanning means.

13. An auto-focus apparatus comprising:
scanning means for scanning an image and producing image signals representing the image;
optical means for projecting the image onto said scanning means;
focusing means for focusing said optical means based on the image signals from said scanning means; and
inhibiting means for inhibiting focusing by said focusing means when the image signal from said scanning means is not in a predetermined state.

14. An apparatus according to claim 13, further comprising means for displaying a message indicating that the focusing is inhibited by said inhibiting means.

15. An apparatus according to claim 13, wherein said optical means allows manual focusing.

16. An apparatus according to claim 13, wherein said focusing means comprises counting means for counting the number of times there is a transition of the image signals produced from said scanning means, and wherein said focusing means focuses said optical means so that a count value of said counting means satisfies a predetermined condition.

17. An apparatus according to claim 16, wherein said inhibiting means inhibits the focusing when the count value of said counting means is below a predetermined value.

18. An apparatus according to claim 13, wherein said optical means projects the image recorded on a film onto said scanning means.

19. An auto-focus apparatus comprising:
scanning means for scanning an image and producing image signals representing the image;
optical means for projecting an image onto said scanning means;
setting means for setting a reference value so that the image signals from said scanning means satisfy a predetermined condition;
comparison means for comparing the image signals from said scanning means with the reference value set by said setting means to convert the image signals into binary image signals; and
focusing means for focusing said optical means so that the binary image signals from said comparison means satisfy a predetermined condition.

20. An apparatus according to claim 19, wherein said setting means comprises counting means for counting the number of times there is a transition of the image signals from said scanning means, and sets the reference value so that a count value of said counting means satisfies a predetermined condition.

21. An apparatus according to claim 19, wherein said setting means selects any one of a plurality of predetermined reference values.

22. An apparatus according to claim 19, wherein said focusing means focuses said optical means so that the number of times there is a transition of the binary image signals satisfies a predetermined condition.

23. An apparatus according to claim 14, wherein said optical means projects the image recorded on a film onto said scanning means.

24. An auto-focus apparatus comprising:
sensor means for producing an output in accordance with incident light;
optical means for projecting an image onto said sensor means;
determining means for determining a focus position of said optical means based on the output of said sensor means; and
focusing means for focusing said optical means based on at least two focus positions determined by said determining means.

25. An apparatus according to claim 24, wherein the at least two focus positions are determined by said determining means with respect to different image positions.

26. An apparatus according to claim 24, wherein said focusing means focuses said optical means based an average value of at least two focus positions determined by said determining means.

27. An apparatus according to claim 24, wherein said optical means projects the image recorded on a film onto said sensor means.

28. An apparatus according to claim 24, further comprising scanning means for scanning the image projected by said optical means and producing image signals representing the image.

29. An apparatus according to claim 24, wherein the at least two focus positions are obtained by means of performing a plural number of times the operation for determination of the focus position by said determining means.

30. An apparatus according to claim 1, wherein said setting means searches the predetermined line with which the image signals from said scanning means satisfy the predetermined condition.

31. An apparatus according to claim 1, wherein a focusing operation of said focusing means is inhibited when a count value of said counting means is below a predetermined value.

32. An apparatus according to claim 1, wherein a focusing scanning means has a line sensor comprising a plurality of photo-electric conversion elements arranged in a line configuration.

33. An apparatus according to claim 3, wherein a focusing operation of said focusing means is inhibited if said detection means does not detect an image line with which a count value of said counting means satisfies the predetermined condition.

34. An apparatus according to claim 3, wherein said scanning means has a line sensor comprising a plurality of photo-electric conversion elements arranged in a line configuration.

35. An apparatus according to claim 11, wherein said focusing means focuses said optical means so that the count value of said count means is at a maximum value.

36. An apparatus according to claim 9, wherein said scanning means has a line sensor comprising a plurality of photo-electric conversion elements arranged in a line configuration, and said moving means moves said line sensor.

37. An apparatus according to claim 16, wherein said focusing means focuses said optical means so that the count value of said counting means is at a maximum value.

38. An apparatus according to claim 16, wherein said counting means counts the number of times there is a transition of the image signals obtained upon scanning different lines of the image with said scanning means.

39. An apparatus according to claim 20, wherein said setting means sets the reference value so that a count value of said counting means is at a maximum value.

40. An apparatus according to claim 20, wherein said setting means sets the reference value so that a difference between a count value of said counting means in a case of in-focus and that in a case of defocus is a maximum value.

41. An apparatus according to claim 22, wherein said focusing means focuses said optical means so that the number of times there is a transition of the binary image signals is a maximum value.

42. An apparatus according to claim 22, wherein said scanning means has a line sensor comprising a plurality of photo-electric conversion elements arranged in a line configuration.

43. An auto-focus apparatus for image reader comprising:
 exposure means for exposing an image recorded on a film;
 scanning means for scanning an image and producing image signals representing the image;
 optical means for projecting image light from the film exposed by said exposure means;
 determining means for determining a focus position of said optical means based on the image signals from said scanning means; and
 focusing means for focusing said optical means based on the focus position determined by said determining means.

44. An apparatus according to claim 43, wherein said determining means determines the focus position based on the number of times there is a transition of the image signals.

45. An apparatus according to claim 43, wherein said scanning means has a line sensor comprising a plurality of photo-electric conversion elements arranged in a line configuration.

46. An apparatus according to claim 43, further comprising moving means for moving a scanning position by said scanning means.

* * * * *

UNITED STATES PATENT AND TRADEMARK OFFICE
CERTIFICATE OF CORRECTION

PATENT NO. : 4,762,985
DATED : August 9, 1988
INVENTOR(S) : RYOICHI IMAI, ET AL.

It is certified that error appears in the above-identified patent and that said Letters Patent is hereby corrected as shown below:

Title page:

AT [56] IN REFERENCES CITED

U.S. Patent Documents,
    "1/1987   Hiramutsu" should read --1/1987   Hiramatsu--.

IN THE DRAWINGS

Sheet 3, Figure 2, "(PALLALEL OUTPUT)" should read --(PARALLEL OUTPUT)--.

Sheet 14, Figure 14, "→STOPAGE" should read --→STORAGE--.

Sheet 15, Figure 15, "SCANNIG SIGNAL" should read --SCANNING SIGNAL--.

Sheet 15, Figure 15, "LENS DRIVING DEUICE" should read --LENS DRIVING DEVICE--.

Sheet 15, Figure 15, "LENS ORIVING SIGNAL" should read --LENS DRIVING SIGNAL--.

Figure 19:
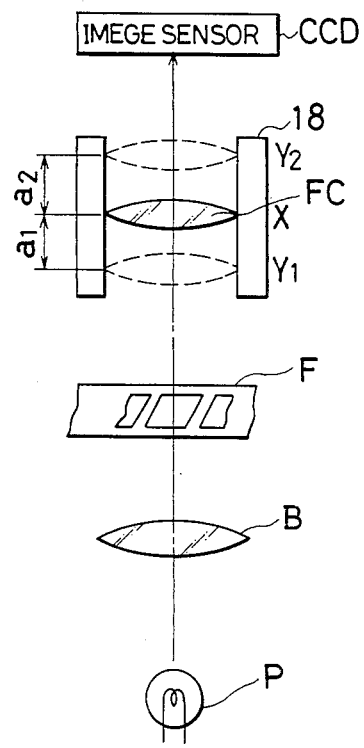
FIG. 19 is an illustration showing a moving state of an imaging lens.

Sheet 18, Figure 19, "IMEGE SENSOR" should read --IMAGE SENSOR--.

Sheet 24, Figure 28, "STEPING MOTOR DRIVER" should read --STEPPING MOTOR DRIVER--.

Sheet 25, Figure 29, "PEREORMING" should read --PERFORMING--.

Sheet 25, Figure 29, "PEFERING" should read --REFERRING--.

COLUMN 7

Line 14, "embodiment,a" should read --embodiment, a--.
    Line 19, "inveniton" should read --invention--.

UNITED STATES PATENT AND TRADEMARK OFFICE
CERTIFICATE OF CORRECTION

PATENT NO. : 4,762,985
DATED : August 9, 1988
INVENTOR(S) : RYOICHI IMAI, ET AL.

It is certified that error appears in the above-identified patent and that said Letters Patent is hereby corrected as shown below:

COLUMN 8

Line 5, "countered" should read --counted--.
Line 45, "disabled" should read --disabled.--.
Line 64, "autofocus" should read --auto-focus--.

COLUMN 9

Line 37, "senosr" should read --sensor--.
Line 54, "of of" should read --of--.

COLUMN 10

Line 67, "abovementioned" should read
--above-mentioned--.

COLUMN 11

Line 10, "imgae" should read --image--.
Line 21, "is" should read --are--.
Line 47, "senso" should read --sensor--.
Line 55, "on" should read --one--.
Line 55, "senso" should read --sensor--.

COLUMN 12

Line 7, "form" should read --from--.
Line 23, "autofocus" should read --auto-focus--.
Line 46, "form" should read --from--.
Line 58, "mtoro" should read --motor--.
Line 67, "operaiton" should read --operation--.

UNITED STATES PATENT AND TRADEMARK OFFICE
CERTIFICATE OF CORRECTION

PATENT NO. : 4,762,985
DATED : August 9, 1988
INVENTOR(S) : RYOICHI IMAI, ET AL.

It is certified that error appears in the above-identified patent and that said Letters Patent is hereby corrected as shown below:

COLUMN 13

Line 6, "operaiton" should read --operation--.

COLUMN 14

Line 36, "form" should read --from--.

COLUMN 15

Line 57, "FIG 18," should read --FIG. 18(B),--.

COLUMN 16

Line 54, "obtianed" should read --obtained--.

COLUMN 17

Line 5, "operaiton" should read --operation--.
    Line 12, "obtian" should read --obtain--.
    Line 44, "data string Y2" should read --data string $\overline{Y2}$--.
    Line 48, "X" should read --$\overline{X}$--.

COLUMN 18

Line 2, "step" should read --steps--.
    Line 9, "data corresponding" should read --data $\overline{X}$ corresponding--.
    Line 16, " 1" should read --$\overline{Y1}$--.
    Line 45, "operaiton." should read --operation.--.

UNITED STATES PATENT AND TRADEMARK OFFICE
CERTIFICATE OF CORRECTION

PATENT NO. : 4,762,985
DATED : August 9, 1988
INVENTOR(S) : RYOICHI IMAI, ET AL.

It is certified that error appears in the above-identified patent and that said Letters Patent is hereby corrected as shown below:

COLUMN 19

Line 26, "half mirror 47" should read --half mirror 49--.
    Line 38, "A" should read --An--.
    Line 39, "a" (first occurrence) should read --an--.
    Line 49, "form" should read --from--.

COLUMN 20

Line 21, "when reaches" should read --when it reaches--.

COLUMN 21

Line 1, "operaiton" should read --operation--.
    Line 48, "obtian" should read --obtain--.

COLUMN 22

Line 40, "auto-focusing" should read --auto-focus apparatus--.
    Line 60, "scanning scanning" should read --scanning--.

COLUMN 23

Line 63, "claim 14," should read --claim 19,--.

UNITED STATES PATENT AND TRADEMARK OFFICE
CERTIFICATE OF CORRECTION

PATENT NO. : 4,762,985
DATED : August 9, 1988
INVENTOR(S) : RYOICHI IMAI, ET AL.

Page 5 of 5

It is certified that error appears in the above-identified patent and that said Letters Patent is hereby corrected as shown below:

COLUMN 24

Line 14, "based an" should read --based on an--.

Signed and Sealed this

Second Day of May, 1989

Attest:

DONALD J. QUIGG

*Attesting Officer*       *Commissioner of Patents and Trademarks*